United States Patent
Ishida et al.

(10) Patent No.: US 8,206,619 B2
(45) Date of Patent: *Jun. 26, 2012

(54) COLOR CORRECTION MATERIAL, FILM-FORMING COMPOSITION, AND OPTICAL FILTER

(75) Inventors: Tatsuya Ishida, Tokyo (JP); Satoshi Yanagisawa, Tokyo (JP); Yosuke Maeda, Tokyo (JP)

(73) Assignee: Adeka Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/990,701

(22) PCT Filed: May 13, 2009

(86) PCT No.: PCT/JP2009/058918
§ 371 (c)(1),
(2), (4) Date: Nov. 2, 2010

(87) PCT Pub. No.: WO2009/145057
PCT Pub. Date: Dec. 3, 2009

(65) Prior Publication Data
US 2011/0049446 A1    Mar. 3, 2011

(30) Foreign Application Priority Data

May 27, 2008 (JP) ................. 2008-137477
May 8, 2009 (JP) ................. 2009-113678

(51) Int. Cl.
G02B 5/23 (2006.01)
G02F 1/1335 (2006.01)
C04B 33/00 (2006.01)

(52) U.S. Cl. ............ 252/586; 349/106; 427/162; 430/7; 501/141; 524/104; 548/455

(58) Field of Classification Search ................. 252/586; 524/104; 501/141; 430/7, 285.1; 349/106; 427/162; 548/455
See application file for complete search history.

(56) References Cited

U.S. PATENT DOCUMENTS
2008/0125524 A1* 5/2008 Ishida et al. ............ 524/104
2008/0207918 A1* 8/2008 Aoyama et al. ............ 548/455

FOREIGN PATENT DOCUMENTS

| JP | 2-293315 | 12/1990 |
| JP | 10-77427 | 3/1998 |
| JP | 3311720 | 5/2002 |
| JP | 2003-82302 | 3/2003 |
| JP | 2004-002491 | 1/2004 |
| JP | 2004-107566 | 4/2004 |
| JP | 2005-194509 | 7/2005 |
| WO | WO 2006/137272 | 12/2006 |
| WO | WO 2008/072537 | 6/2008 |

OTHER PUBLICATIONS

International Search Report, PCT/2009/058918, Jul. 14, 2009.

* cited by examiner

*Primary Examiner* — Bijan Ahvazi
(74) *Attorney, Agent, or Firm* — Young & Thompson

(57) ABSTRACT

A color correction material contains at least one type of cyanine compound composed of a cyanine cation represented by general formula (I) below (wherein the symbols are as defined in the description) and a q-valent anion represented by pAn$^{q-}$ (wherein the symbols are as defined in the description), and at least one type of layered clay mineral; or a color correction material containing a clay mineral composite obtained by intercalating a cyanine cation represented by general formula (I) below, or preferably the cyanine cation and an organic cation, into a layered clay mineral. Also described is a film-forming composition containing the color correction material and an optical filter having a layer composed of the film-forming composition.

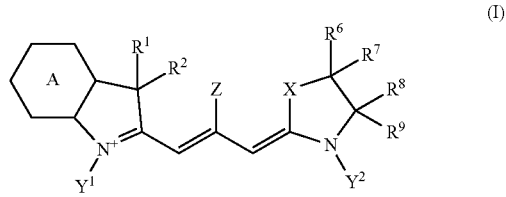

(I)

Ring A represents a benzene ring or a naphthalene ring; X represents $CR^3R^4$, $NR^5$, an oxygen atom, a sulfur atom, or a selenium atom.

11 Claims, No Drawings

COLOR CORRECTION MATERIAL, FILM-FORMING COMPOSITION, AND OPTICAL FILTER

TECHNICAL FIELD

The present invention relates to a color correction material containing a specific colorant compound and a layered clay mineral, a color correction material containing an inorganic-organic composite obtained by intercalating a specific colorant cation and an organic cation into a layered clay mineral, a film-forming composition obtained by blending the color correction material with a binder resin, and an optical filter having a layer composed of the film-forming composition. The optical filter is useful particularly as optical filters for image display devices.

BACKGROUND ART

Compounds having strong light absorption at specific wavelengths are used in recording layers of optical recording media such as CD-Rs, DVD-Rs, DVD+Rs, and blue laser recording discs and in optical elements of image display devices such as liquid crystal displays (LCDs), plasma display panels (PDPs), electroluminescence displays (ELDs), cathode-ray tube displays (CRTs), fluorescent display tubes, and field emission displays.

Such compounds, when employed as optical elements in image display devices, are used e.g. as light absorbers in color filters, wherein colored pixels are formed on a substrate and white light is passed therethrough to allow originally-monochrome display sections to be displayed in color. Image display devices create color images by combining light in the three primary colors, red, blue, and green, but the beam used for creating the color images includes light that lowers display quality, such as 480- to 520-nm light between blue and green and 550- to 600-nm light between green and red, and also includes 750- to 1100-nm light that possibly causes malfunction of infrared remote controllers. Thus, optical filters are required to have a function of selectively absorbing light in such unwanted wavelengths in displaying color images and/or at the time of operating infrared remote controllers, and also a function of absorbing light ranging from 480 to 500 nm and from 540 to 560 nm in order to prevent reflection and glare of external light from fluorescent lamps etc. In image display devices and the like, therefore, optical filters containing light-absorbing compounds (light absorbers) that selectively absorb light at such wavelengths are used aside from color filters.

In recent years, there has also been a demand for light absorbers that can selectively absorb light at wavelengths particularly ranging from 480 to 500 nm in order to provide display elements with sufficient color purity and color separation and thus achieve high image quality. Such light absorbers are expected to have an extremely sharp light absorption—i.e., a small half width at $\lambda_{max}$—and also the ability to maintain their functionalities even when subjected to light and/or heat, for example.

Conventionally, an optical filter has been manufactured by laminating an optical film containing a light-absorbing compound (light absorber) that selectively absorbs light at specific wavelengths onto a transparent substrate, such as glass, by means of an adhesive layer. Such a process, however, results in high cost because of the many steps involved in production and also has difficulty in making the optical filters thin.

Meanwhile, Patent Document 1 discloses a film for electronic displays containing a colorant and carbon black in the adhesive layer. Patent Document 2 discloses an adhesive containing a colorant. Patent Document 3 discloses a filter for displays using an adhesive containing a colorant.

It is, however, difficult to prevent the colorant compounds in the adhesive layers from causing degradation due to light, heat, etc., and there still is no optical filter that can ensure sufficient optical properties.

Further, Patent Document 4 discloses water-based ink containing a color material made by intercalating a dye into a clay. Patent Document 5 discloses a clay mineral composite in which organic cations and an intercalant are held between layers of a clay mineral. Patent Document 6 discloses a fluorescent, layered inorganic-organic composite in which aliphatic quaternary-ammonium ions and a cationic laser colorant are borne on a cation-exchangeable inorganic layered compound. However, nothing has been suggested about the use of such color materials or colored composites in optical filters or about improvement of moisture-and-heat resistance of optical filters by using such color materials or clay mineral composites. Further, Patent Document 7 discloses an optical filter containing a cyanine compound having good absorption properties particularly in the range of 480 to 500 nm. However, it describes nothing about using the cyanine compound in combination with a clay mineral or about using the cyanine compound by forming it into a clay mineral composite.

Citation List

Patent Document

Patent Document 1: JP-A-2003-82302
Patent Document 2: JP-A-2004-107566
Patent Document 3: Japanese Patent No. 3311720
Patent Document 4: JP-A-10-77427
Patent Document 5: JP-A-2-293315
Patent Document 6: JP-A-2004-2491
Patent Document 7: JP-A-2005-194509

SUMMARY OF INVENTION

Problems to be Solved by the Invention

Accordingly, an object of the present invention is to provide an optical filter that has sharp light absorption particularly at wavelengths ranging from 480 to 500 nm and that has excellent lightfastness, heat resistance, and moisture-and-heat resistance even in a system having an adhesive layer.

Means for Solving the Problems

After diligent research, Inventors have found that the above object can be achieved by using, in an adhesive layer of an optical filter, a specific colorant compound and a layered clay mineral in combination, or a clay mineral composite obtained by intercalating a specific colorant cation into a layered clay mineral.

The present invention has been made based on the above finding, and provides a color correction material (also referred to hereinafter as "first color correction material") containing: at least one type of cyanine compound (C) composed of a cyanine cation (A) represented by general formula (I) below and a q-valent anion (B) represented by pAn$^{q-}$ (wherein q is an integer of 1 or 2, and p represents a coefficient for keeping the electric charge neutral); and at least one type of layered clay mineral (D).

[Chem. 1]

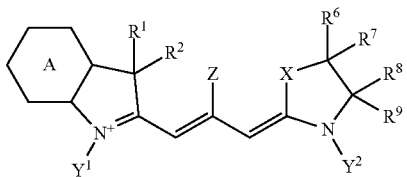

wherein:

ring A represents a benzene ring or a naphthalene ring; the hydrogen atom in the ring A may be substituted by an alkyl group having 1 to 10 carbon atoms, an aryl group having 6 to 20 carbon atoms, an arylalkyl group having 7 to 20 carbon atoms, a nitro group, a cyano group, or a halogen atom;

X represents $CR^3R^4$, $NR^5$, an oxygen atom, a sulfur atom, or a selenium atom;

$R^1$, $R^2$, $R^3$, $R^4$, and $R^5$ each independently represent a group represented by general formula (II) or (II') below, an alkyl group having 1 to 20 carbon atoms, an aryl group having 6 to 30 carbon atoms, or an arylalkyl group having 7 to 30 carbon atoms; $R^1$ and $R^2$, or $R^3$ and $R^4$, may be connected to form a 3- to 6-membered alicyclic group;

$R^6$, $R^7$, $R^8$, and $R^9$ each independently represent a hydrogen atom, a group represented by general formula (II) or (II') below, an alkyl group having 1 to 20 carbon atoms, an aryl group having 6 to 30 carbon atoms, an arylalkyl group having 7 to 30 carbon atoms, a halogen atom, or a cyano group;

$Y^1$ and $Y^2$ each independently represent an alkyl group having 1 to 20 carbon atoms, an aryl group having 6 to 30 carbon atoms, an arylalkyl group having 7 to 30 carbon atoms, or a group represented by general formula (III) below; the methylene group in the alkyl group, the aryl group, and the arylalkyl group, which are the groups that may substitute the hydrogen atom in the ring A or the groups that may be represented by $R^1$, $R^2$, $R^3$, $R^4$, $R^5$, $R^6$, $R^7$, $R^8$, $R^9$, $Y^1$, and $Y^2$, may be interrupted 1 to 3 times by an oxygen atom, a sulfur atom, or a double bond; the hydrogen atom in the alkyl group, the aryl group, and the arylalkyl group may be substituted by a nitro group, a cyano group, or a halogen atom; and Z represents a hydrogen atom, a halogen atom, or a cyano group;

[Chem. 2]

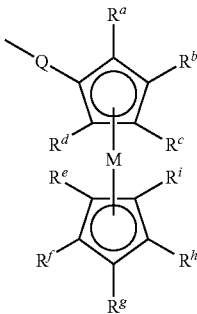

in the above general formula (II): the bond between G and T is a double bond, a conjugated double bond, or a triple bond; G represents a carbon atom; T represents a carbon atom, an oxygen atom, or a nitrogen atom (if T is an oxygen atom, then y and z are 0; if T is a nitrogen atom, then y+z is 0 or 1);

w represents a number from 0 to 4; x, y, and z each represent 0 or 1;

$R^{01}$, $R^{02}$, $R^{03}$, and $R^{04}$ each independently represent a hydrogen atom, a hydroxyl group, a nitro group, a cyano group, a halogen atom, or an optionally substituted alkyl group having 1 to 4 carbon atoms; the methylene group in the alkyl group may be interrupted by —O— or —CO—; and $R^{01}$ and $R^{04}$ may be bonded to form a cycloalkene ring or a heterocycle;

in the above general formula (II'): the bond between G' and T' is a double bond or a conjugated double bond; G' represents a carbon atom; T' represents a carbon atom or a nitrogen atom;

w' represents a number from 0 to 4; $R^{01'}$ represents a hydrogen atom, a hydroxyl group, a nitro group, a cyano group, a halogen atom, or an alkyl group having 1 to 4 carbon atoms optionally substituted with a halogen atom; the methylene group in the alkyl group may be interrupted by —O— or —CO—;

the ring containing G' and T' represents a 5-membered ring that may contain a hetero atom, a 6-membered ring that may contain a hetero atom, a naphthalene ring, a quinoline ring, an isoquinoline ring, an anthracene ring, or an anthraquinone ring; and the ring containing G' and T' may be substituted by a halogen atom, a hydroxyl group, a nitro group, a cyano group, an alkyl group having 1 to 4 carbon atoms, or an alkoxy group having 1 to 4 carbon atoms;

[Chem. 3]

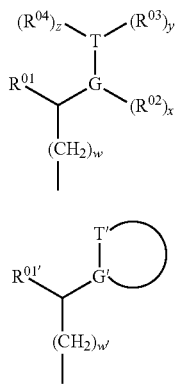

wherein:

$R^a$, $R^b$, $R^c$, $R^d$, $R^e$, $R^f$, $R^g$, $R^h$, and $R^i$ each independently represent a hydrogen atom or an alkyl group having 1 to 4 carbon atoms; the methylene group in the alkyl group may be interrupted by —O— or —CO—;

Q represents a direct bond or an optionally substituted alkylene group having 1 to 8 carbon atoms; the methylene group in the alkylene group may be replaced by —O—, —S—, —CO—, —COO—, —OCO—, —SO$_2$—, —NH—, —CONH—, —NHCO—, —N=CH—, or —CH=CH—; and M represents Fe, Co, Ni, Ti, Cu, Zn, Zr, Cr, Mo, Os, Mn, Ru, Sn, Pd, Rh, Pt, or Ir.

The present invention also provides a color correction material (also referred to hereinafter as "second color correction material") containing a clay mineral composite (G) obtained by intercalating a cyanine cation (A) represented by the above general formula (I) into a layered clay mineral (D).

The present invention also provides a film-forming composition obtained by blending a binder resin (E) to the above-mentioned color correction material, and an optical filter having a layer composed of the film-forming composition.

Advantageous Effects of Invention

The present invention can provide an optical filter having excellent lightfastness, heat resistance, and moisture-and-heat resistance. The optical filter is suitable for improving display quality of image display devices and preventing glare of external light.

DESCRIPTION OF EMBODIMENTS

A color correction material, a film-forming composition, and an optical filter of the present invention will be described in detail below according to preferred embodiments thereof. Note that the "color correction material" of the present invention refers to a material having a function of selectively absorbing light of specific wavelengths, and preferably light of wavelengths ranging from 480 to 500 nm.

First, the first color correction material will be described. The first color correction material contains: at least one type of cyanine compound (C) composed of a cyanine cation (A) represented by the above general formula (I) and a q-valent anion (B) represented by $pAn^{q-}$; and at least one type of layered clay mineral (D).

As regards the substituents that may substitute the hydrogen atom in the benzene ring or the naphthalene ring represented by the ring A in the above general formula (I), examples of the alkyl group having 1 to 10 carbon atoms include methyl, ethyl, propyl, isopropyl, butyl, s-butyl, t-butyl, isobutyl, amyl, isoamyl, t-amyl, hexyl, cyclohexyl, heptyl, isoheptyl, t-heptyl, n-octyl, isooctyl, t-octyl, 2-ethylhexyl, trifluoromethyl, methoxy, ethoxy, propoxy, isopropoxy, butoxy, s-butoxy, t-butoxy, trifluoromethyloxy, methylthio, ethylthio, propylthio, isopropylthio, butylthio, s-butylthio, and t-butylthio.

Examples of the aryl group having 6 to 20 carbon atoms include phenyl, naphthyl, 2-methylphenyl, 3-methylphenyl, 4-methylphenyl, 4-vinylphenyl, and 3-isopropylphenyl.

Examples of the arylalkyl group having 7 to 20 carbon atoms include benzyl, phenethyl, 2-phenylpropane-2-yl, diphenylmethyl, triphenylmethyl, styryl, and cinnamyl.

Examples of the halogen atom include fluorine, chlorine, bromine, and iodine.

Examples of the alkyl group having 1 to 20 carbon atoms represented by $R^1$, $R^2$, $R^3$, $R^4$, $R^5$, $R^6$, $R^7$, $R^8$, $R^9$, $Y^1$, and $Y^2$ include methyl, ethyl, propyl, isopropyl, butyl, s-butyl, t-butyl, isobutyl, amyl, isoamyl, t-amyl, hexyl, cyclohexyl, cyclohexylmethyl, 2-cyclohexylethyl, heptyl, isoheptyl, t-heptyl, n-octyl, isooctyl, t-octyl, 2-ethylhexyl, nonyl, isononyl, decyl, dodecyl, tridecyl, tetradecyl, pentadecyl, hexadecyl, heptadecyl, octadecyl, 2-methoxyethyl, 3-methoxypropyl, 4-methoxybutyl, 2-butoxyethyl, methoxyethoxyethyl, methoxyethoxyethoxyethyl, 3-methoxybutyl, and 2-methylthioethyl.

Examples of the aryl group having 6 to 30 carbon atoms include phenyl, naphthyl, 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-t-butylphenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-t-butylphenyl, cyclohexylphenyl, 2-phenoxyethyl, and 2-phenylthioethyl.

Examples of the arylalkyl group having 7 to 30 carbon atoms include benzyl, phenethyl, 2-phenylpropane-2-yl, diphenylmethyl, triphenylmethyl, styryl, and cinnamyl.

$R^1$ and $R^2$, as well as $R^3$ and $R^4$, may be connected to form a 3- to 6-membered alicyclic group. Examples of the 3- to 6-membered alicyclic group include cyclopropane-1,1-diyl, cyclobutane-1,1-diyl, 2,4-dimethylcyclobutane-1,1-diyl, 3-dimethylcyclobutane-1,1-diyl, cyclopentane-1,1-diyl, cyclohexane-1,1-diyl, tetrahydropyran-4,4-diyl, thiane-4,4-diyl, piperidine-4,4-diyl, N-substituted piperidine-4,4-diyl, morpholine-2,2-diyl, morpholine-3,3-diyl, N-substituted morpholine-2,2-diyl, and N-substituted morpholine-3,3-diyl. Examples of the N-substituents include groups given as examples for the substituents in the ring A.

Examples of the halogen atom represented by $R^6$, $R^7$, $R^8$, and $R^9$, the halogen atom that may substitute the alkyl group, the aryl group, and the arylalkyl group represented by $R^1$, $R^2$, $R^3$, $R^4$, $R^5$, $R^6$, $R^7$, $R^8$, $R^9$, $Y^1$, and $Y^2$, and the halogen atom represented by Z include fluorine, chlorine, bromine, and iodine.

Examples of the halogen atom represented by $R^{O1}$, $R^{O2}$, $R^{O3}$, and $R^{O4}$ in the above general formula (II) and $R^{O1'}$ in the above general formula (II') include fluorine, chlorine, bromine, and iodine.

Examples of the alkyl group having 1 to 4 carbon atoms represented by $R^{O1}$, $R^{O2}$, $R^{O3}$, and $R^{O4}$ in the above general formula (II) and $R^{O1'}$ in the above general formula (II') include methyl, ethyl, propyl, isopropyl, butyl, s-butyl, t-butyl, and isobutyl.

Examples of the group in which the methylene group in the alkyl group is replaced by —O— include methoxy, ethoxy, propyloxy, isopropyloxy, methoxymethyl, ethoxymethyl, and 2-methoxyethyl.

Examples of the group in which the methylene group in the alkyl group is replaced by —CO— include acetyl, 1-carbonylethyl, acetylmethyl, 1-carbonylpropyl, 2-oxobutyl, 2-acetylethyl, and 1-carbonylisopropyl. Any of these groups may have a substituent.

Examples of the cycloalkene ring formed by connecting $R^{O1}$ and $R^{O4}$ include a cyclopropene ring, a cyclobutene ring, a cyclopentene ring, and a cyclohexene ring.

Examples of the heterocycle formed by connecting $R^{O1}$ and $R^{O4}$ include a tetrahydropyran ring, a piperidine ring, a piperazine ring, a pyrrolidine ring, a morpholine ring, a thiomorpholine ring, a pyridine ring, a pyrazine ring, a pyrimidine ring, a pyridazine ring, a triazine ring, a quinoline ring, an isoquinoline ring, an imidazole ring, an oxazole ring, an imidazolidine ring, a pyrazolidine ring, an isoxazolidine ring, and an isothiazolidine ring. The ring may be fused with another ring or may be substituted.

Examples of the substituent in the alkyl group having 1 to 4 carbon atoms represented by $R^{O1}$, $R^{O2}$, $R^{O3}$, and $R^{O4}$ in the above general formula (II) and by $R^{O1'}$ in the above general formula (II') and in the ring structure formed by connecting $R^{O1}$ and $R^{O4}$ in the above general formula (II) include the substituents described as examples in the above general formula (I). Note that, if $R^{O1}$, $R^{O2}$, $R^{O3}$, $R^{O4}$, or $R^{O1'}$ is an alkyl group having 1 to 4 carbon atoms etc. and also has, among the above-described substituents, a substituent containing a carbon atom, then the total number of carbon atoms in $R^{O1}$ etc., including those of the substituent, should be within the defined range.

In the above general formula (II'): examples of the 5-membered ring that may contain a hetero atom include a cyclopentene ring, a cyclopentadiene ring, an imidazole ring, a thiazole ring, a pyrazole ring, an oxazole ring, an isoxazole ring, a thiophen ring, a furan ring, and a pyrrole ring; and examples of the 6-membered ring that may contain a hetero atom include a benzene ring, a pyridine ring, a piperazine ring, a piperidine ring, a morpholine ring, a pyrazine ring, a pyrone ring, and a pyrrolidine ring.

In the above general formula (III): examples of the alkyl group having 1 to 4 carbon atoms represented by $R^a$, $R^b$, $R^c$, $R^d$, $R^e$, $R^f$, $R^g$, $R^h$, and $R^i$ include those described as examples in the above general formula (II);

examples of the group in which the methylene group in the alkyl group is replaced by —O— include methoxy, ethoxy, propyloxy, isopropyloxy, methoxymethyl, ethoxymethyl, and 2-methoxyethyl; and examples of the group in which the methylene group in the alkyl group is replaced by —CO— include acetyl, 1-carbonylethyl, acetylmethyl, 1-carbonylpropyl, 2-oxobutyl, 2-acetylethyl, and 1-carbonylisopropyl.

In the above general formula (III): examples of the optionally substituted alkylene group having 1 to 8 carbon atoms represented by Q include methylene, ethylene, propylene, methylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, octylene, ethane-1,1-diyl, and propane-2,2-diyl; and examples of the group in which the methylene group in the alkylene group is replaced by —O—, —S—, —CO—, —COO—, —OCO—, —SO$_2$—, —NH—, —CONH—, —NHCO—, —N=CH—, or —CH=CH— include methyleneoxy, ethyleneoxy, oxymethylene, thiomethylene, carbonylmethylene, carbonyloxymethylene, methylenecarbonyloxy, sulfonylmethylene, aminomethylene, acetylamino, ethylenecarboxyamide, ethanimidoyl, ethenylene, and propenylene.

Examples of the substituent in the alkylene group having 1 to 8 carbon atoms represented by Q in the above general formula (III) include those described as examples in the above general formulae.

It is preferable to use a cyanine cation wherein X in the above general formula (I) is a sulfur atom, because it provides a color correction material having excellent optical properties.

Also, because of the low production cost, it is preferable to use a cyanine cation wherein, in the above general formula (I): $R^1$ and $R^2$ are both methyl groups; $R^5$, $R^6$, $R^7$, and $R^8$ are all hydrogen atoms; and $Y^1$ and $Y^2$ are alkyl groups having 1 to 8 carbon atoms.

The cyanine cation (A) has a resonance structure as shown in [Chem. 4] below, and may take either structural formula. Further, the cyanine cation (A) used in the present invention may have optical isomers, such as enantiomers, diastereomers, or racemates, in which the asymmetric carbon atoms to which the groups represented by $R^1$ and $R^2$, $R^3$ and $R^4$, $R^6$ and $R^7$, and $R^8$ and $R^9$ are respectively bonded serve as chiral centers. In this case, any one of the optical isomers may be used in isolated form, or a mixture of several optical isomers may be used.

[Chem. 4]

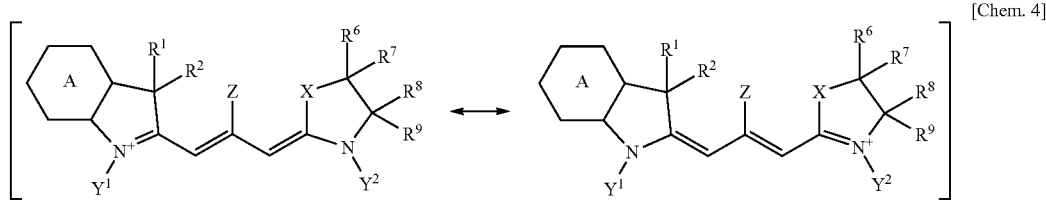

Specific examples of the cyanine cation (A) represented by the above general formula (I) include the following compounds shown in [Chem. 5] through [Chem. 8-2] below.

[Chem. 5]

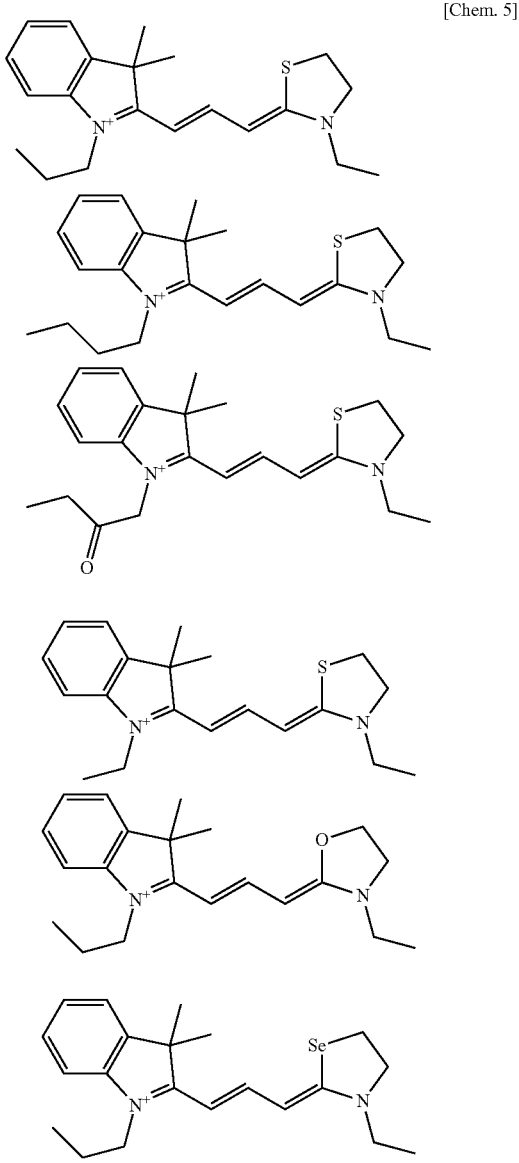

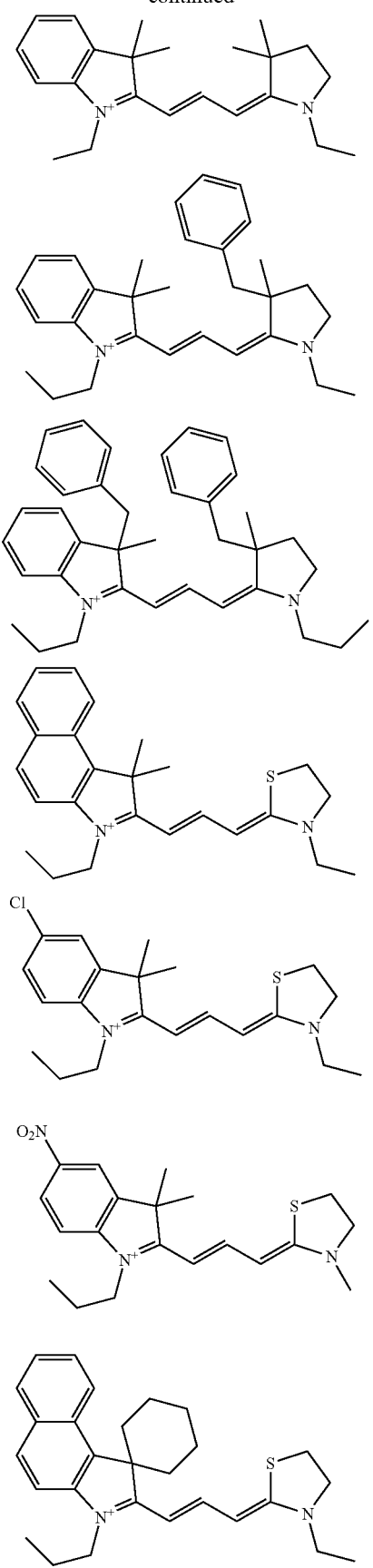
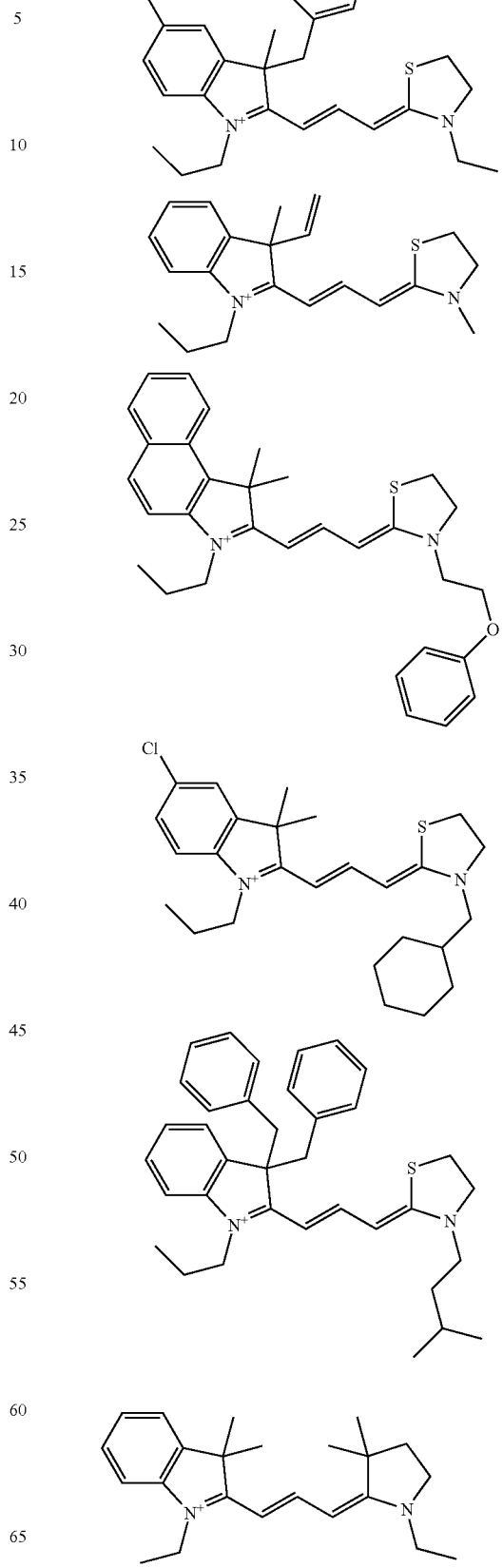
[Chem. 6]

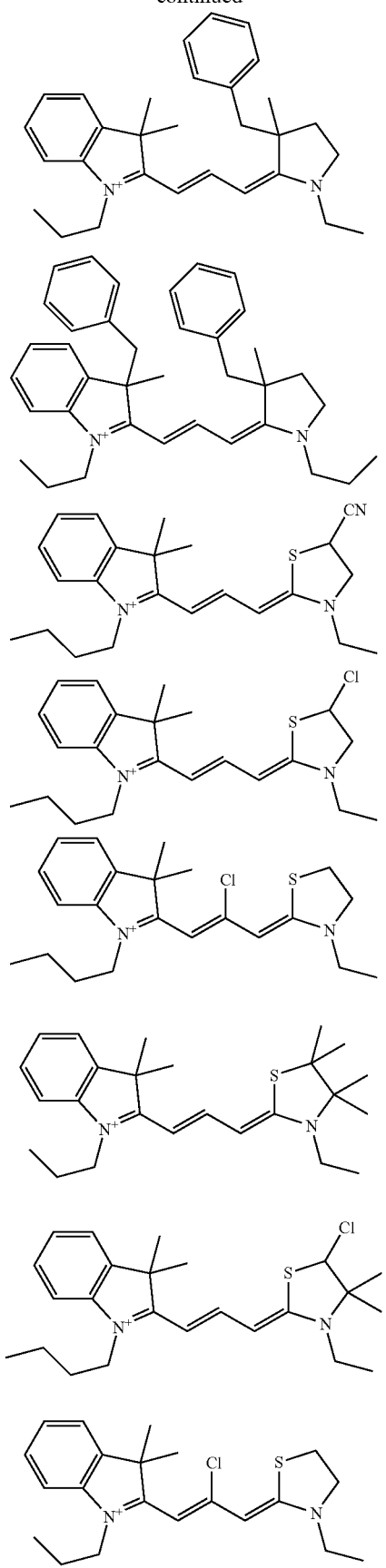
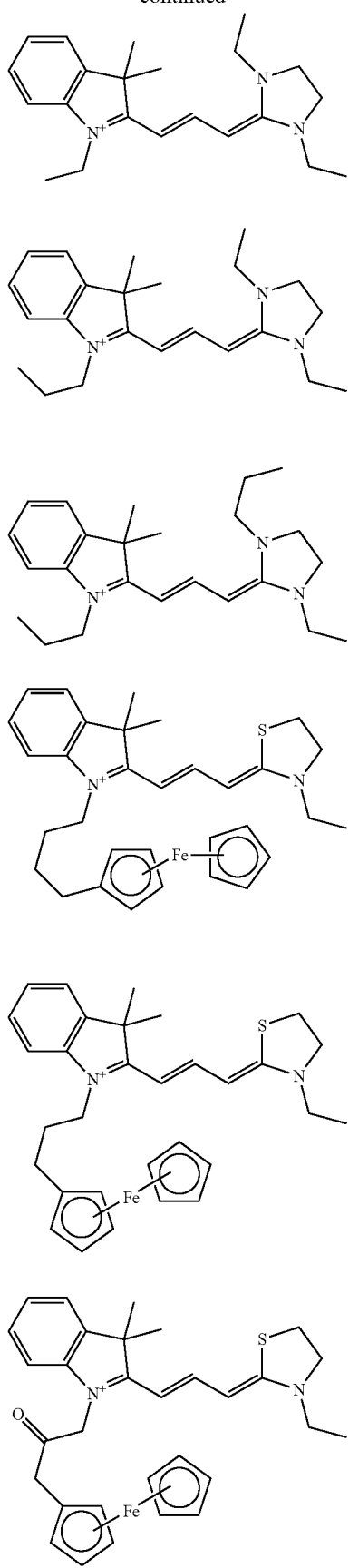

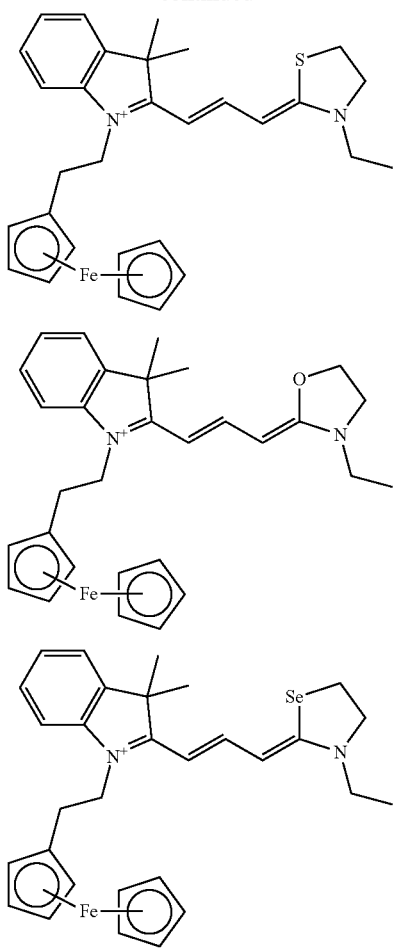
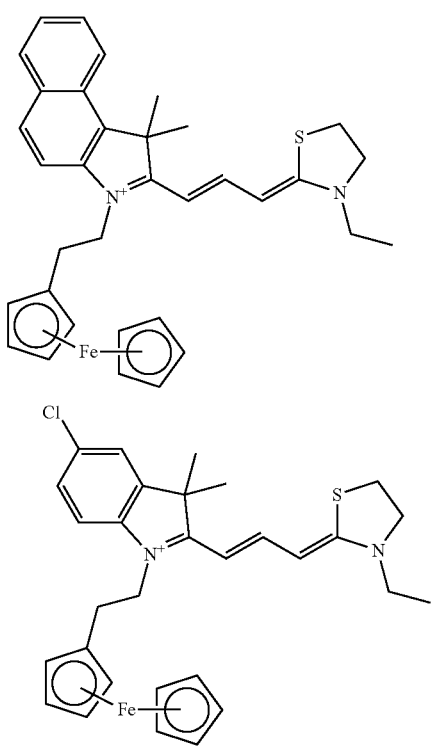
[Chem. 7]
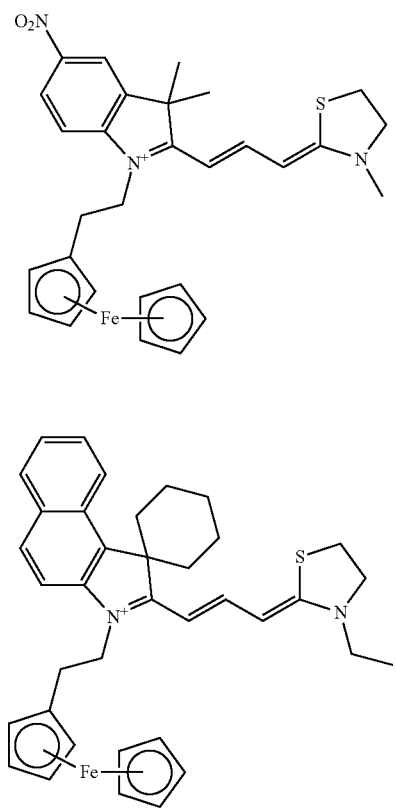
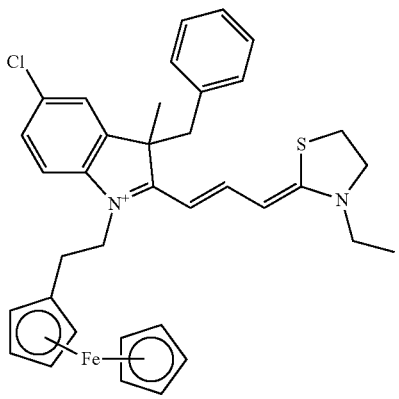
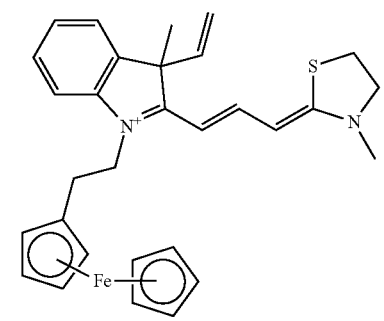

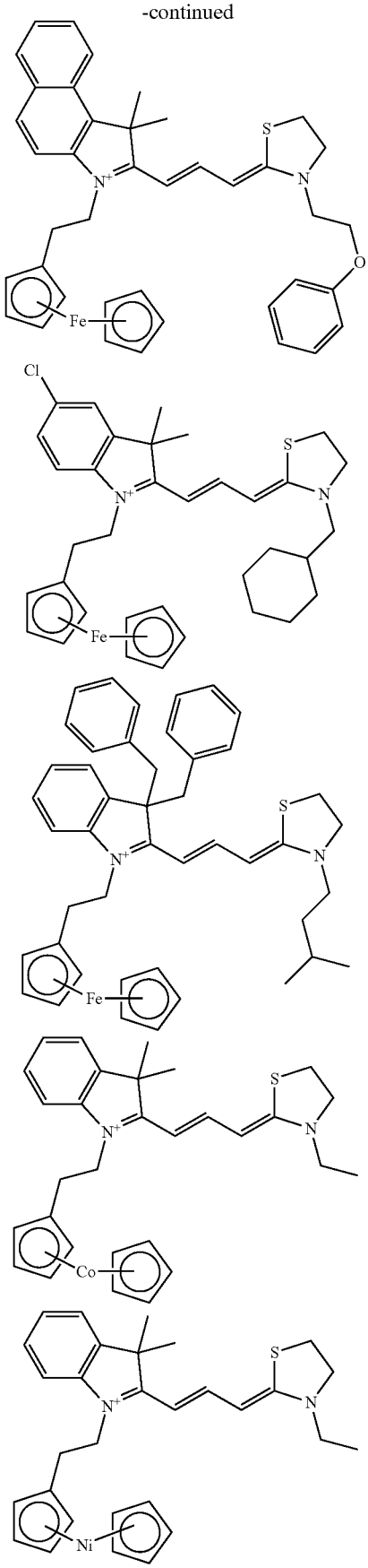
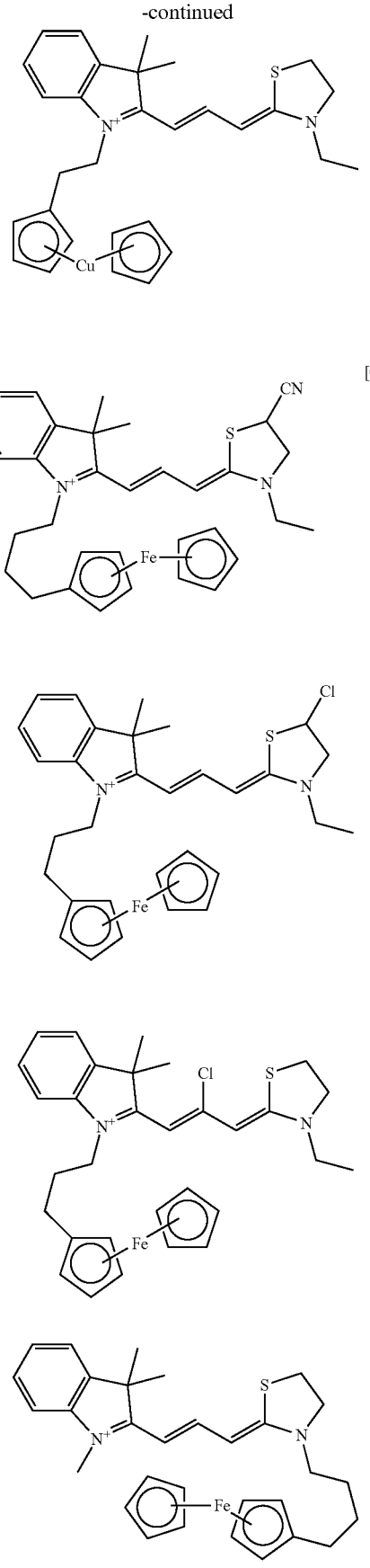

-continued
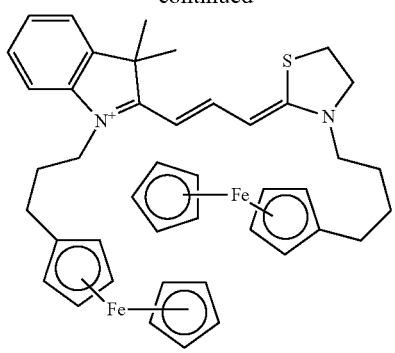
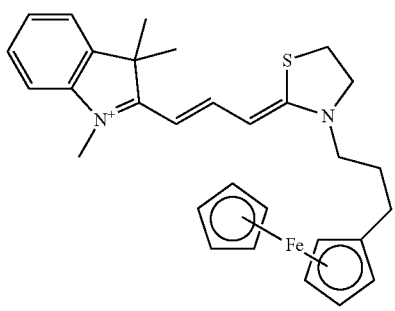
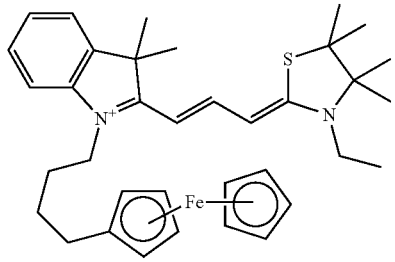
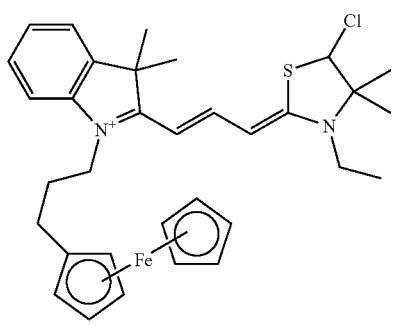
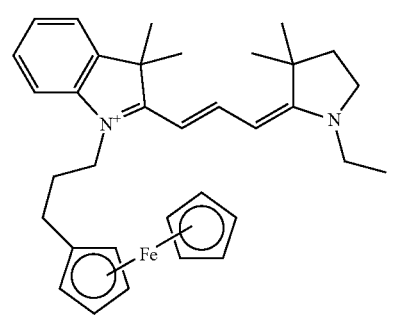
-continued
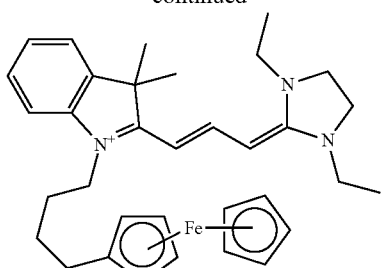
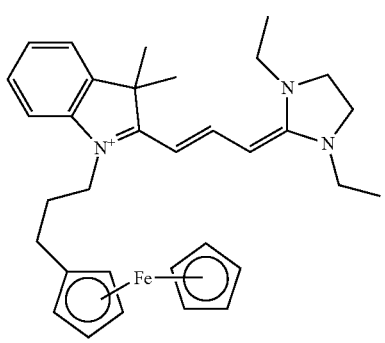
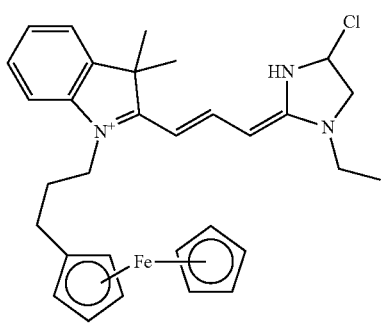
[Chem. 8-2]
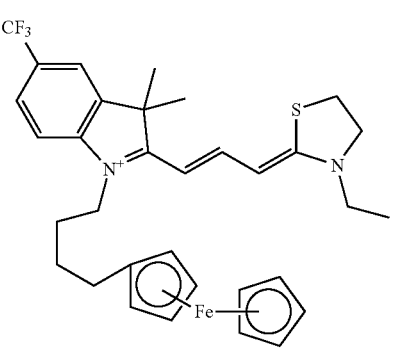
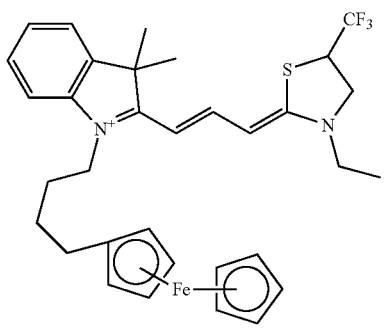

-continued

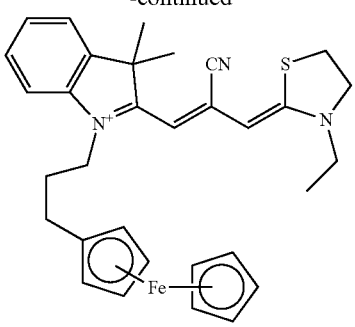

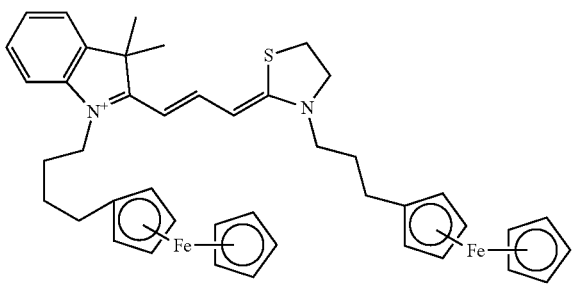

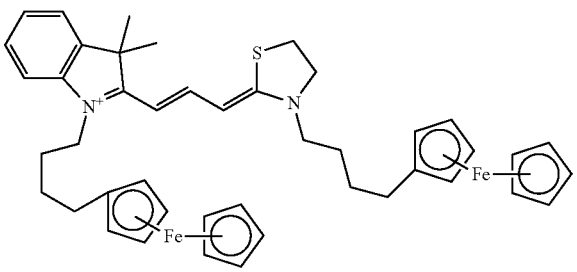

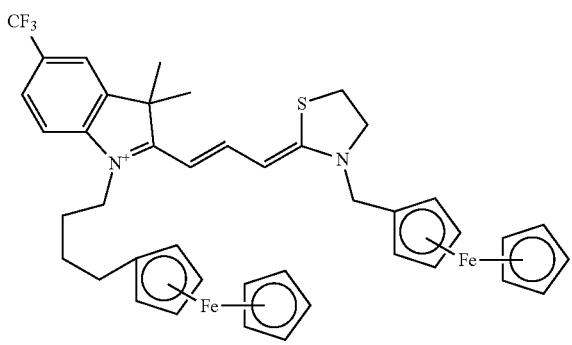

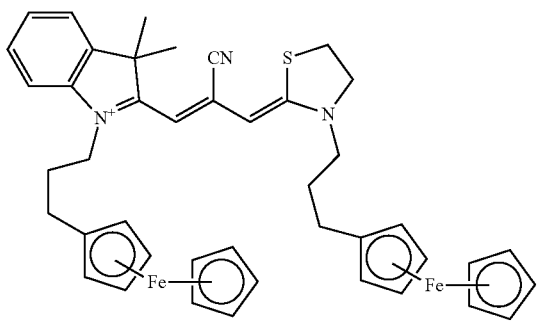

The q-valent anion (B) represented by $An^{q-}$ may be a monovalent anion or a divalent anion. Examples of monovalent anions include: halide ions, such as chloride, bromide, iodide, and fluoride; inorganic anions, such as perchlorate, chlorate, thiocyanate, hexafluorophosphate, hexafluoroantimonate, and tetrafluoroborate; organic sulfonate anions, such as benzenesulfonate, toluenesulfonate, trifluoromethanesulfonate, diphenylamine-4-sulfonate, 2-amino-4-methyl-5-chlorobenzenesulfonate, 2-amino-5-nitrobenzenesulfonate, and N-alkyl (or aryl) diphenylamine-4-sulfonate; organic phosphate anions, such as octylphosphate, dodecylphosphate, octadecylphosphate, phenylphosphate, nonylphenylphosphate, 2,2'-methylene-bis(4,6-di-t-butylphenyl) phosphonate; bis-trifluoromethylsulfonylimide ions; bis-perfluorobutanesulfonylimide ions; perfluoro-4-ethylcyclohexanesulfonate ions; tetrakis(pentafluorophenyl) borate ions; and tris(fluoroalkylsulfonyl)carbanions.

Examples of divalent anions include benzenedisulfonate and naphthalenedisulfonate. If necessary, it is also possible to use, for example, quencher anions having a function of de-exciting (quenching) excited active molecules, and/or metallocene anions, such as ferrocene and ruthenocene, in which an anionic group, such as a carboxyl, a phosphonate, or a sulfonate group, is present on the cyclopentadienyl ring(s). Further, the coefficient "p" is selected so that the electric charge is kept neutral within the entire molecule.

Examples of the quencher anions include anions represented by general formula (1) or (2) below, or anions represented by chemical formula (3), (4), (5), (6), (7), (8), (9), (10), (11), or (12) below. Examples also include anions disclosed in U.S. Pat. No. 5,268,478 A1, U.S. Pat. No. 6,218,072 B1, US 2002/028918 A1, US 2005/226135 A1, U.S. Pat. No. 4,900,648 A, or U.S. Pat. No. 6,168,843 B1, all of which are incorporated herein by reference. Further examples include anions disclosed, for example, in JP-A-60-234892, JP-A-5-305770, JP-A-6-239028, JP-A-9-309886, JP-A-9-323478, JP-A-10-45767, JP-A-2000-168237, and JP-A-2002-201373.

[Chem. 9]

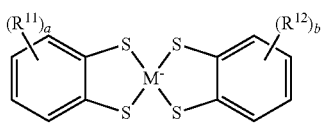

(1)

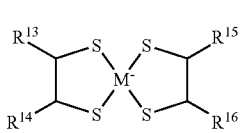

(2)

wherein M is as defined for general formula (I); $R^{11}$ and $R^{12}$ each independently represent a halogen atom, an alkyl group having 1 to 8 carbon atoms, an aryl group having 6 to 30 carbon atoms, or —$SO_2$-G; G represents an alkyl group, an optionally halogen-substituted aryl group, a dialkylamino group, a diarylamino group, a piperidino group, or a morpholino group; a and b each independently represent an integer of 0 to 4; and $R^{13}$, $R^{14}$, $R^{15}$, and $R^{16}$ each independently represent an alkyl group, an alkylphenyl group, an alkoxyphenyl group, or a halogenated phenyl group.

[Chem. 10-1]
(3)
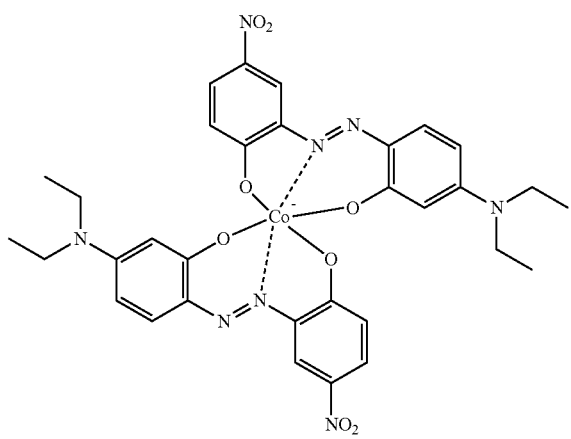
(4)
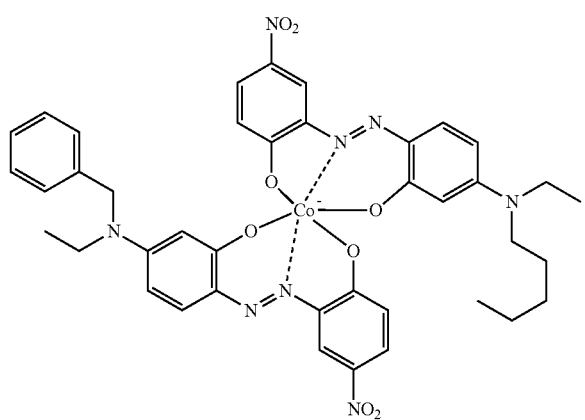
(5)
[Chem. 10-2]
(6)
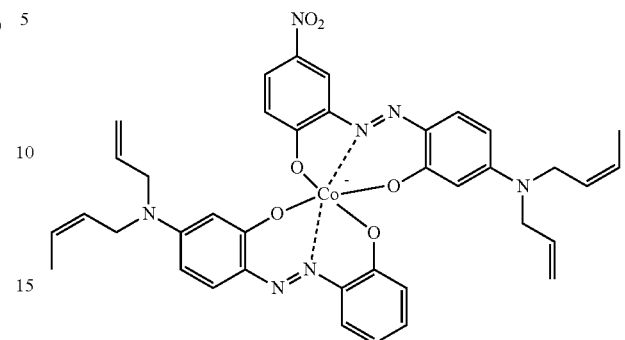
(7)
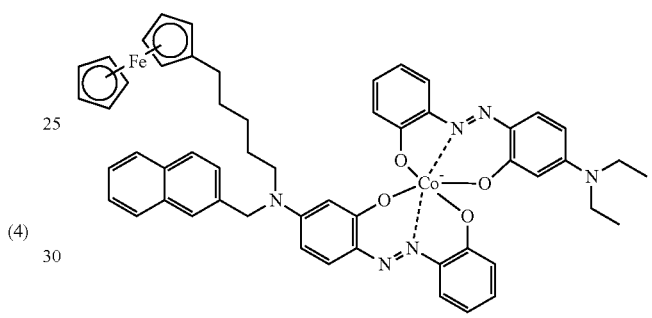
(8)
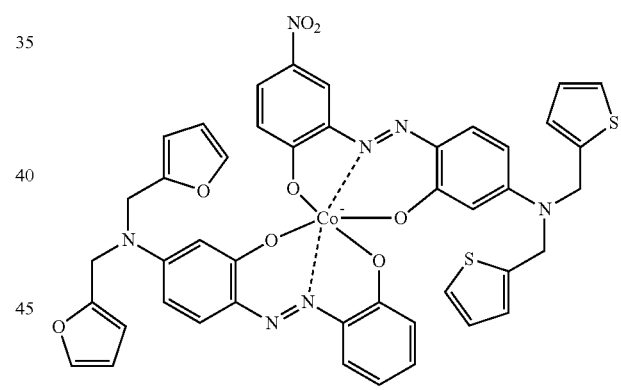
(9)
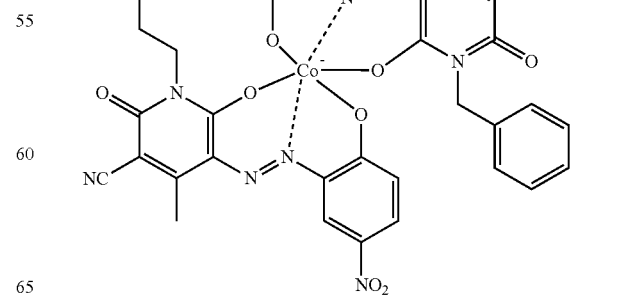

[Chem. 10-3]

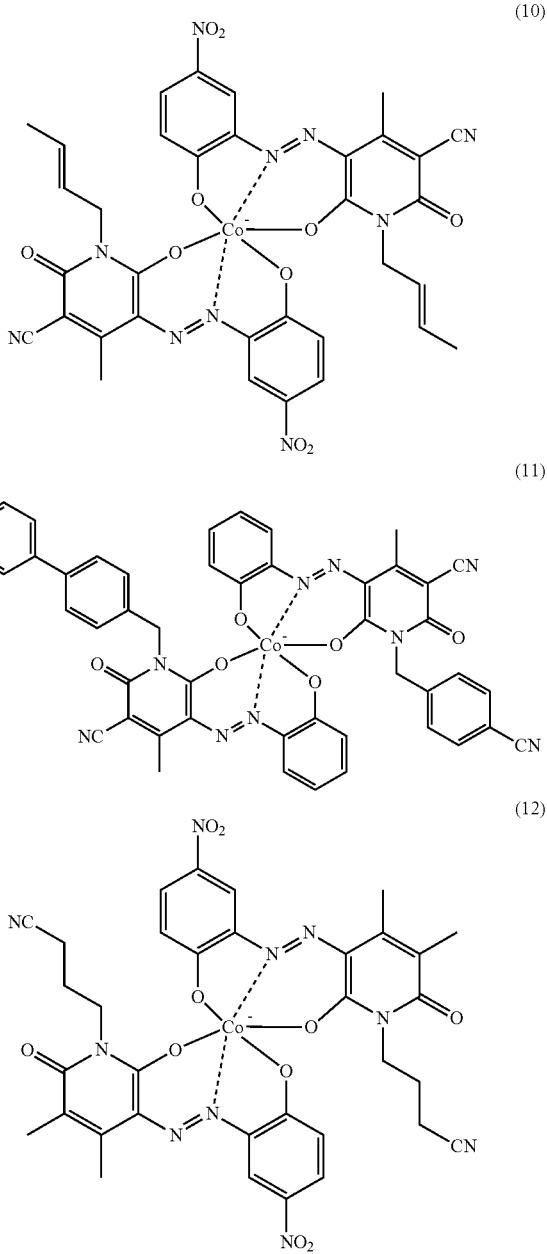

(10)

(11)

(12)

The cyanine compound (C) is composed of the above-described cyanine cation (A) and the above-described q-valent anion (B).

In the first color correction material, the content of the cyanine compound (C) with respect to the first color correction material is preferably 0.001 to 50% by mass, and more preferably 0.01 to 10% by mass. The cyanine compound (C) may be used singly, or two or more types thereof may be used in combination.

As for the layered clay mineral (D), it is possible to use naturally-occurring products, chemically-synthesized products, products having lithium ions, sodium ions, or calcium ions between their layers, substitution products thereof, derivatives thereof, and mixtures thereof. Specific examples may include smectites, kaoline minerals, mica, talc, chlorite, hydrotalcite, vermiculite, and fluorine-vermiculite. Examples of smectites may include hectorite, saponite, stevensite, beidellite, montmorillonite, bentonite, and nontronite. Examples of kaoline minerals may include kaolinite, halloysite, nacrite, dickite, chrysotile, lizardite, amesite, and pyrophyllite. Examples of mica clay minerals may include synthetic mica, such as Li-type fluorine taeniolite, Na-type fluorine taeniolite, and Na-type tetrasilicic fluorine mica. Among the above, smectites and mica are preferred because of their high functionality.

Among the smectites, purified smectites from which impurities have been removed are preferred, and oleophilic smectites having a good affinity for high-polymer binders and organic solvents are further preferred. Oleophilic smectites are obtained by using the above-described smectite clay mineral(s) as a base and treating it/them with quaternary ammonium ions or the like to make it/them oleophilic. Accordingly, in cases where oleophilic smectites are used, the later-described organic cations (F) will exist as interlayer (intercalant) ions in the oleophilic smectites.

Commercially-available smectites may also be used, and examples include "Lucentite" SWN and SWF (hydrophilic smectite; product of Co-op Chemical Co., Ltd.), "Lucentite" STN, STN-A, SPN, SEN, SAN, SAN2C, SAN210, STF, SSN, SSN-A, SAN312-A, SAN2C-A, and SAN210-A (oleophilic smectite; product of Co-op Chemical Co., Ltd.), "Kunipia T" (montmorillonite; product of Kunimine Industries Co., Ltd.), "S-BEN N-400" and "S-BEN N-400FP" (montmorillonite; product of Hojun Co., Ltd.), and "Benton" (product of Toshin Chemicals Co., Ltd.). Among them, it is preferable to use "STN-A", "SSN-A", "SAN210-A", "SAN312-A", or "SAN2C" which have been purified to remove impurities because they are less prone to agglomerate and thus have good dispersibility when formed into a clay mineral composite.

Among the above-described mica, purified mica from which impurities have been removed is preferred, and swelling mica having a good affinity for high-polymer binders and organic solvents is further preferred.

Commercially-available mica may be used, and examples include "Somasif" (swelling mica; product of Co-op Chemical Co., Ltd.) and "Micromica" (non-swelling mica; product of Co-op Chemical Co., Ltd.).

In the first color correction material, the content of the layered clay mineral (D) with respect to the first color correction material is preferably 0.01 to 90% by mass, and more preferably 0.1 to 30% by mass.

Next, the second color correction material will be described. Note that the detailed description regarding the first color correction material applies as appropriate to features of the second color correction material that are not particularly described below.

The second color correction material contains a clay mineral composite (G) described below.

The clay mineral composite (G) is made by intercalating a cyanine cation (A) represented by the above general formula (I)—and preferably the cyanine cation (A) represented by the general formula (I) and the organic cation (F)—into the layered clay mineral (D), and is used in combination with a binder resin (E) if necessary. Examples of the layered clay mineral (D) and the cyanine cation (A) used for making the clay mineral composite (G) include those described as examples for the above-mentioned layered clay mineral (D) and the cyanine cation (A).

Examples of the organic cation (F) include quaternary ammonium ions and phosphonium ions. The quaternary ammonium ion preferably has an alkyl group, an aryl group, or an arylalkyl group. Particularly preferred quaternary ammonium ions are those having an alkyl group with 1 to 20 carbon atoms, those having an aryl group with 6 to 30 carbon atoms, and those having an arylalkyl group with 7 to 30 carbon atoms; for they have high affinity with an organic solvent when exchanged with the cyanine cations (A) and have a moderate viscosity when dispersed in an organic solvent. Specific examples of quaternary ammonium ions include tetramethylammonium, tetraethylammonium, tetra-n-decylammonium, tetra-n-dodecylammonium, trioctyl methyl ammonium, trimethyl stearyl ammonium, dimethyl distearyl ammonium, trilauryl methyl ammonium, dimethyl dioctadecyl ammonium, dimethyl didecyl ammonium, dimethyl stearyl benzyl ammonium, and compounds shown in [Chem. 11] below.

Examples of phosphonium ions include alkylphosphonium and arylphosphonium ions.

[Chem. 11]

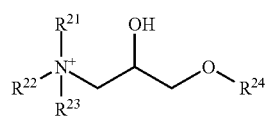

wherein $R^{21}$, $R^{22}$, $R^{23}$, and $R^{24}$ each independently represent an alkyl group having 1 to 20 carbon atoms.

In the clay mineral composite (G), the proportions of the cyanine cation (A) and the organic cation (F) used with respect to 1 part of layered clay mineral (D) are: 0.01 to 0.9 parts, preferably 0.1 to 0.5 parts, of cyanine cation (A); and 0.1 to 0.99 parts, preferably 0.5 to 0.9 parts, of organic cation (F). If the amount of the cyanine cation A is less than 0.01 parts, the content of the cyanine cation (A) will be too small, which will in turn increase the amount of clay mineral composite (G) to be added; on the other hand, an amount of over 0.9 parts may impair the dispersibility to organic solvents and may deteriorate the processability of the color correction material. Note that, when using a mixture of several types of cyanine cations as the present cyanine cation (A), the "usage amount" of the cyanine cation (A) refers to the total amount of all the cyanine cations.

In the second color correction material, the content of the clay mineral composite (G) with respect to the second color correction material is preferably 0.0001 to 90% by mass, and more preferably 0.001 to 50% by mass.

For example, the clay mineral composite (G) may be prepared as follows, although not limited thereto. In cases of using an oleophilic layered clay mineral (D) that has organic cations (F) intercalated therein in advance to impart oleophilicity: a suspension prepared by dispersing the layered clay mineral (D) into an organic solvent is mixed with a solution prepared by dissolving a salt of the cyanine cation (A) and an anion (B) into an organic solvent, to ion-exchange a portion of the organic cations (F), which are the intercalant ions of the layered clay mineral (D), with the cyanine cations (A); and the obtained product is separated, purified, and dried, to obtain a clay mineral composite (G).

In cases where the layered clay mineral (D) is hydrophilic, then either:

(i) the layered clay mineral (D) is dispersed into water to prepare a suspension; the intercalant ions of the layered clay mineral are ion-exchanged with organic cations (F); the dispersion is treated with acid by adding an acid thereto in amounts that will render the dispersion weakly-basic to acidic; and the obtained product is separated and dried; or (ii) the layered clay mineral is dispersed into water; the dispersion is treated with acid by adding an acid thereto in amounts that will render the dispersion weakly-basic to acidic; the obtained layered clay mineral is dispersed into water to prepare a suspension; the intercalant ions of the layered clay mineral are ion-exchanged with organic cations (F); and the obtained product is separated and dried.

Then, the dried product obtained through (i) or (ii) is treated as in the above-mentioned case of using an oleophilic layered clay mineral (D), so that a portion of the organic cations (F), which are the intercalant ions of the product, is ion-exchanged with the cyanine cations (A), to obtain a clay mineral composite (G).

It is not preferable to use the obtained product as-is as a coating fluid for the color correction material without separating and drying it into a clay mineral composite. This is because the residual components insoluble in the organic solvent, such as quaternary ammonium salts, deteriorate the moisture-and-heat resistance of the obtained color correction material, and also, there is difficulty in ion-exchanging the organic cations (F), which are the intercalant ions of the layered clay mineral (D), with the cyanine cations (A) and thus a larger amount of the layered clay mineral (D) must be blended, which, in turn, leads to an increase in viscosity of the coating fluid, to agglomeration of the clay mineral composite (G), and also to cost increase.

As described above, the color correction material of the present invention either contains at least one type of cyanine compound (C) including a cyanine cation (A) represented by the general formula (I), or a clay mineral composite (G) obtained by intercalating at least one type of cyanine cation (A) into a layered clay mineral (D). The present color correction material may be used in combination with one or more types of known colorant compounds such as cyanine compounds and/or colorant cations used in conventional color correction materials.

Specific examples of colorant compounds include cyanine compounds other than the cyanine compound (C), diimmonium compounds, aminium compounds, metal salts of azo compounds, azomethine dye compounds, triarylmethane dye compounds, naphthalimide compounds, naphtholactam compounds, oxazine compounds, thiazine compounds, azaxanthene compounds, quinoline compounds, indamine dye compounds, rhodamine dye compounds, squarylium-based compounds, and styryl-based dye compounds. Furthermore, the above colorant compound(s) may be used to prepare the clay mineral composite (G) having colorant cations intercalated into the layered clay mineral (D).

Among these colorant compounds, it is preferable to add a cyanine compound and a diimmonium compound, or to make a clay mineral composite by intercalating, into a layered clay mineral, cations of the cyanine compound and cations of the diimmonium compound, because of good lightfastness and moisture-and-heat resistance due to insusceptibility to external factors such as ultraviolet rays and moisture and because of the good affinity for low-polarity organic solvents.

As for the cyanine compound and the diimmonium compound, it is possible to use known compounds generally used as near-infrared radiation absorbing compounds in color correction materials. It is, however, preferable to use cyanine compounds and diimmonium compounds including the same anions as those of the cyanine compound (C) of the present invention, because the stability of the coating fluid can be increased.

From the standpoint of absorbing unwanted light, a cyanine compound including a cyanine cation represented by general formula (IV) below (also referred to hereinafter as "cyanine compound represented by general formula (IV)") may preferably be used as the above-mentioned cyanine compound.

[Chem. 12-1]

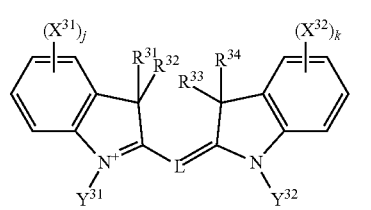

(IV)

wherein, $R^{31}$, $R^{32}$, $R^{33}$, $R^{34}$, $Y^{31}$, and $Y^{32}$ are the same as in the above general formula (I); $X^{31}$ and $X^{32}$ each independently represent an alkyl group, an aryl group, an arylalkyl group, a heterocyclic group, a halogen atom, a nitro group, —$CF_3$, or —$OCF_3$; -L=represents a group shown in [Chem. 12-2] below; j and k represent an integer from 0 to 4; and if j or/and k each is/are 2 or above, the plurality of $X^{31}$ or/and $X^{32}$ may be different substituents and/or the plurality of $X^{31}$, as well as the plurality of $X^{32}$, may form a ring.

[Chem. 12-2]

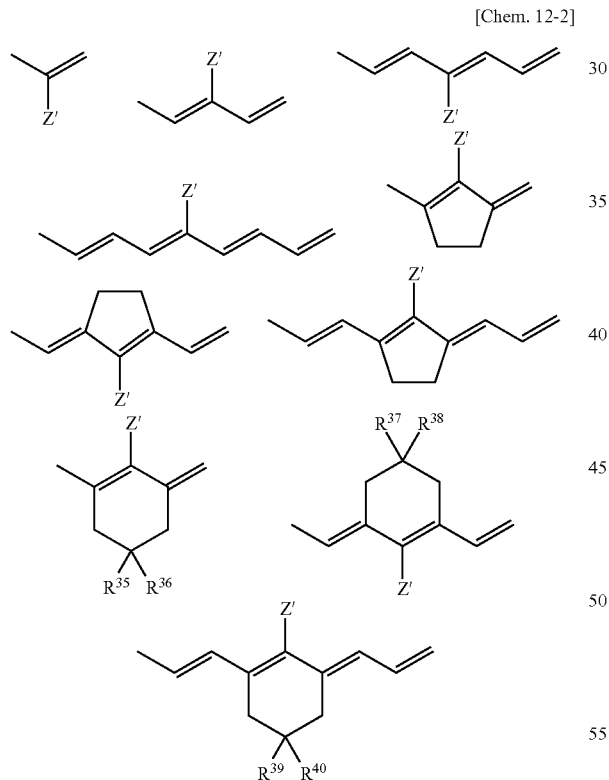

wherein, $R^{35}$, $R^{36}$, $R^{37}$, $R^{38}$, $R^{39}$, and $R^{40}$ each independently represent a hydrogen atom, a hydroxyl group, a halogen atom, a cyano group, an aryl group having 6 to 30 carbon atoms, a diphenylamino group, an alkyl group having 1 to 8 carbon atoms, or an alkoxy group having 1 to 8 carbon atoms; Z' represents a hydrogen atom, a hydroxyl group, a halogen atom, a cyano group, a diphenylamino group, an aryl group having 6 to 30 carbon atoms, an arylalkyl group having 7 to 30 carbon atoms, or an alkyl group having 1 to 8 carbon atoms; and the alkylene part in the alkyl group or the arylalkyl group may be replaced by an ether bond or a thioether bond.

Specific examples of cyanine cations represented by the above general formula (IV) include the following cations shown in [Chem. 13-1] to [Chem. 14] below.

[Chem. 13-1]

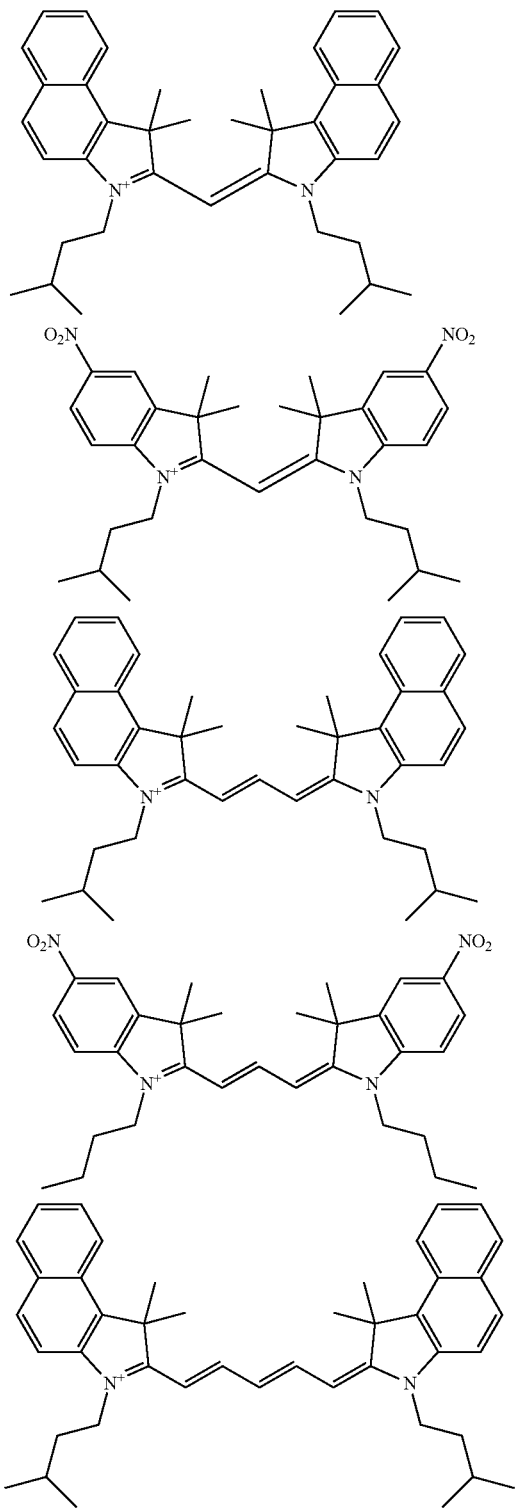

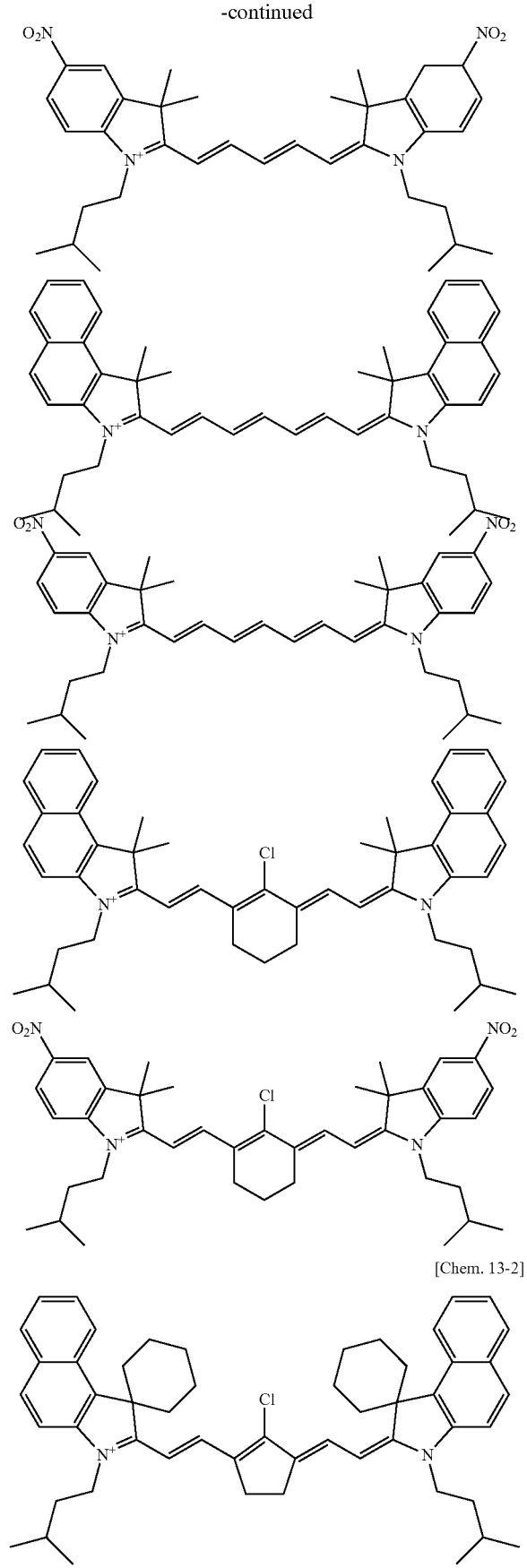
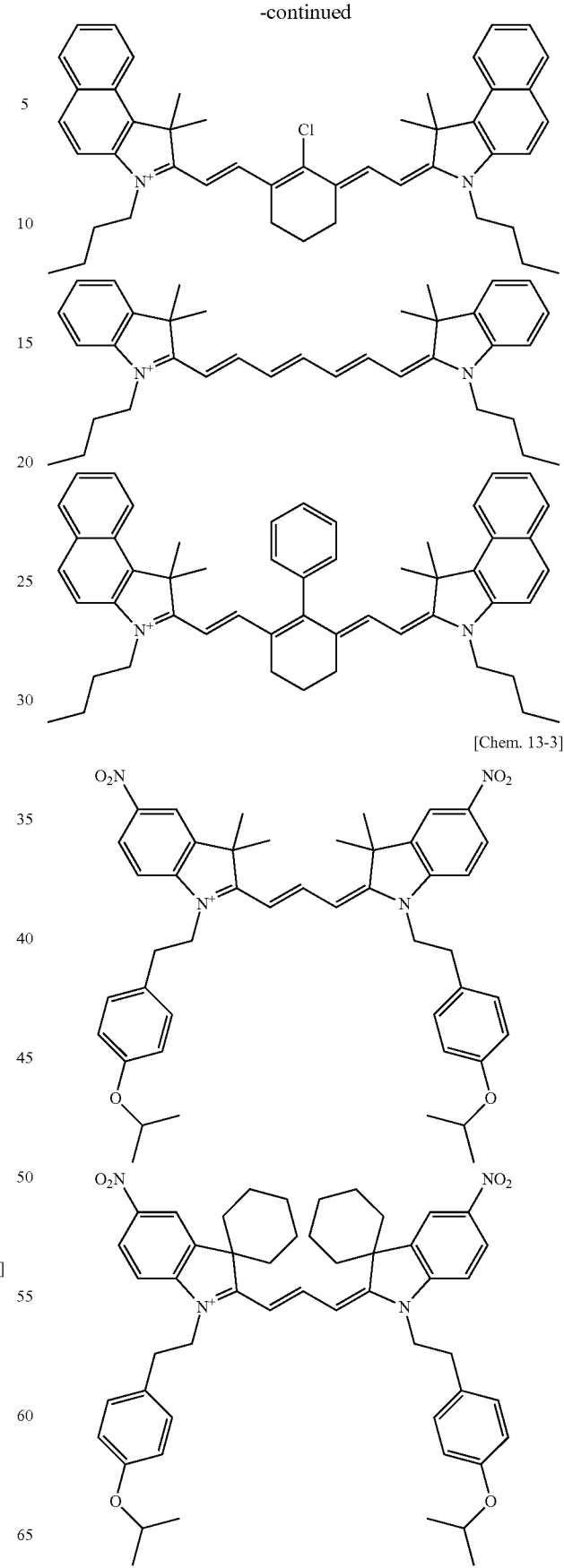

31
-continued
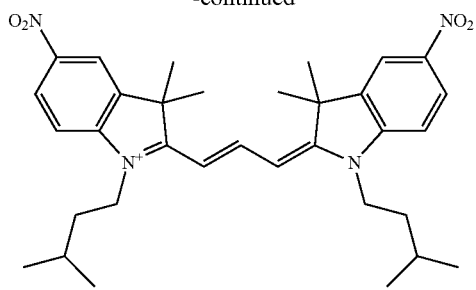
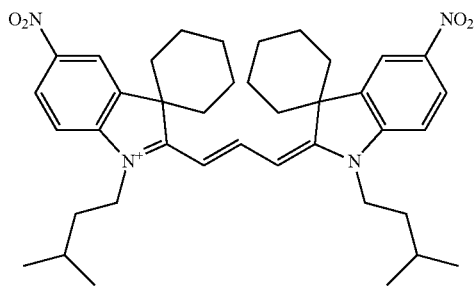
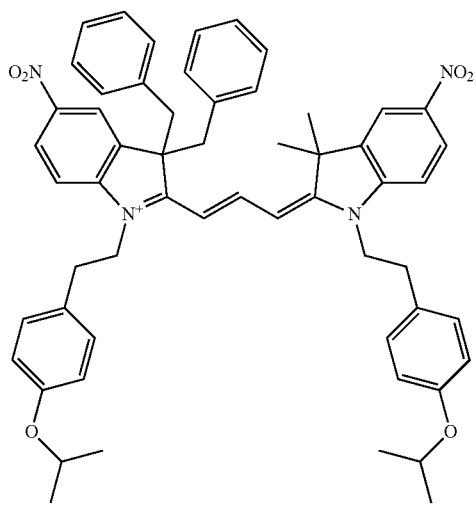
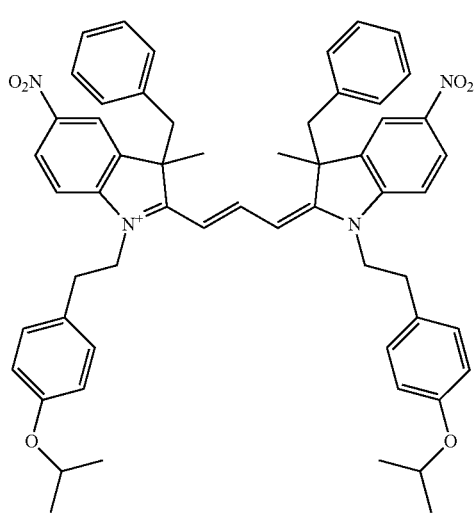
32
-continued
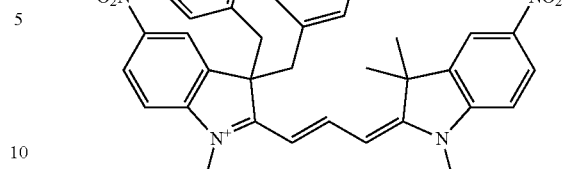
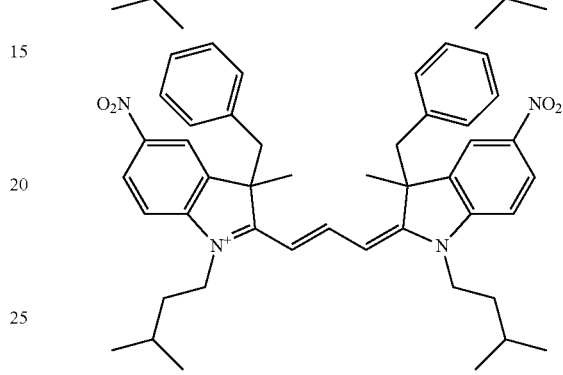
[Chem. 14]
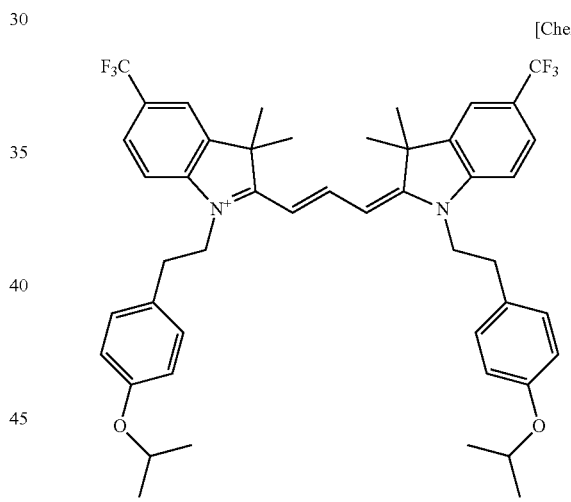
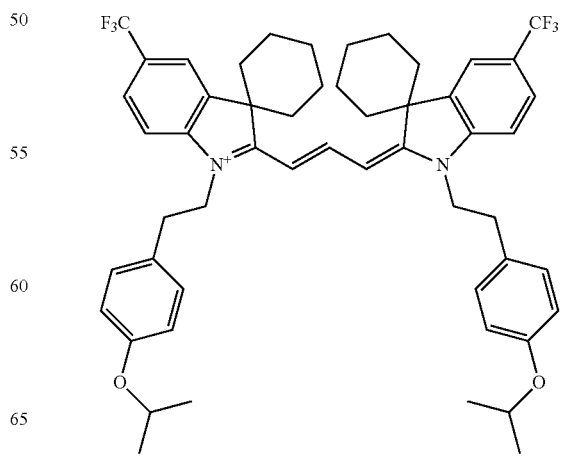

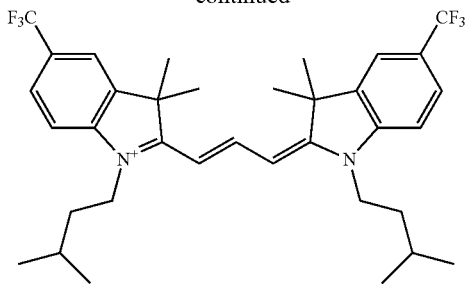
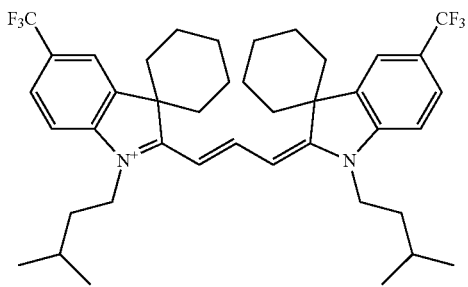
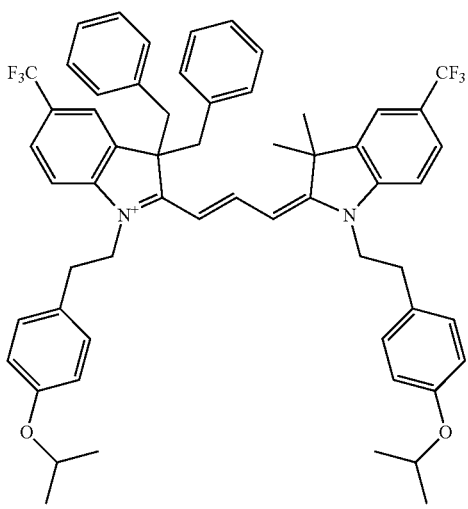
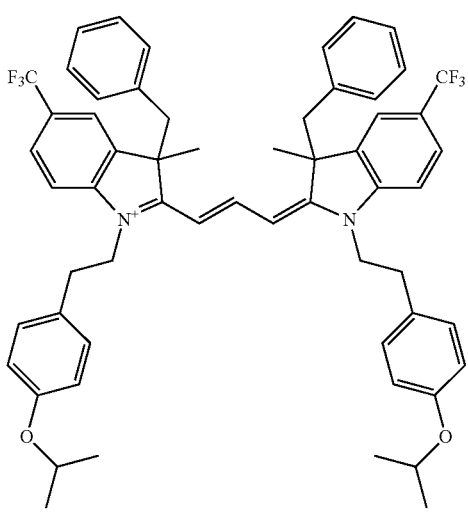
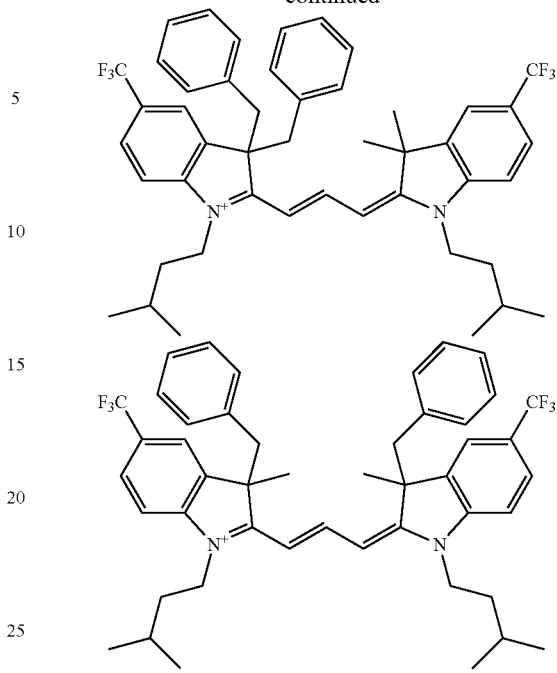

From the standpoint of absorbing unwanted light, a diimmonium compound including a diimmonium cation represented by general formula (V) below (also referred to hereinafter as "diimmonium compound represented by general formula (V)") may preferably be used as the above-mentioned diimmonium compound.

[Chem. 15]

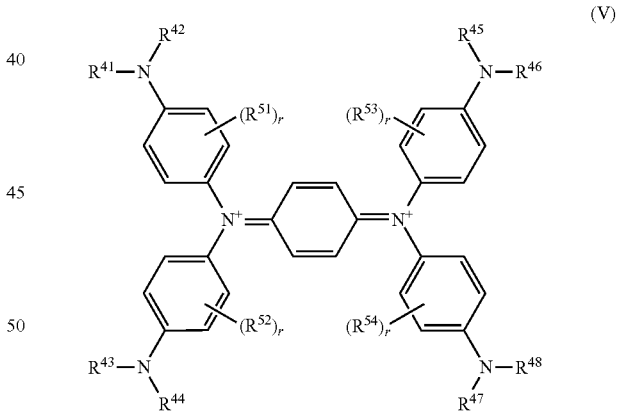

wherein:
$R^{41}$, $R^{42}$, $R^{43}$, $R^{44}$, $R^{45}$, $R^{46}$, $R^{47}$, and $R^{48}$ each independently represent a hydrogen atom or an alkyl group having 1 to 8 carbon atoms; $R^{51}$, $R^{52}$, $R^{53}$, and $R^{54}$ each independently represent a hydrogen atom, a halogen atom, an alkyl group having 1 to 8 carbon atoms, or an amino group; the alkyl group represented by $R^{41}$, $R^{42}$, $R^{43}$, $R^{44}$, $R^{45}$, $R^{46}$, $R^{47}$, $R^{48}$, $R^{51}$, $R^{52}$, $R^{53}$, and $R^{54}$, and the amino group represented by $R^{51}$, $R^{52}$, $R^{53}$, and $R^{54}$ may be substituted;
the methylene group in the alkyl group having 1 to 8 carbon atoms may be replaced by —O—, or —CH=CH—; r represents a number from 1 to 4.

Specific examples of diimmonium cations represented by the above general formula (V) include the following cations shown in [Chem. 16] below.

[Chem. 16]

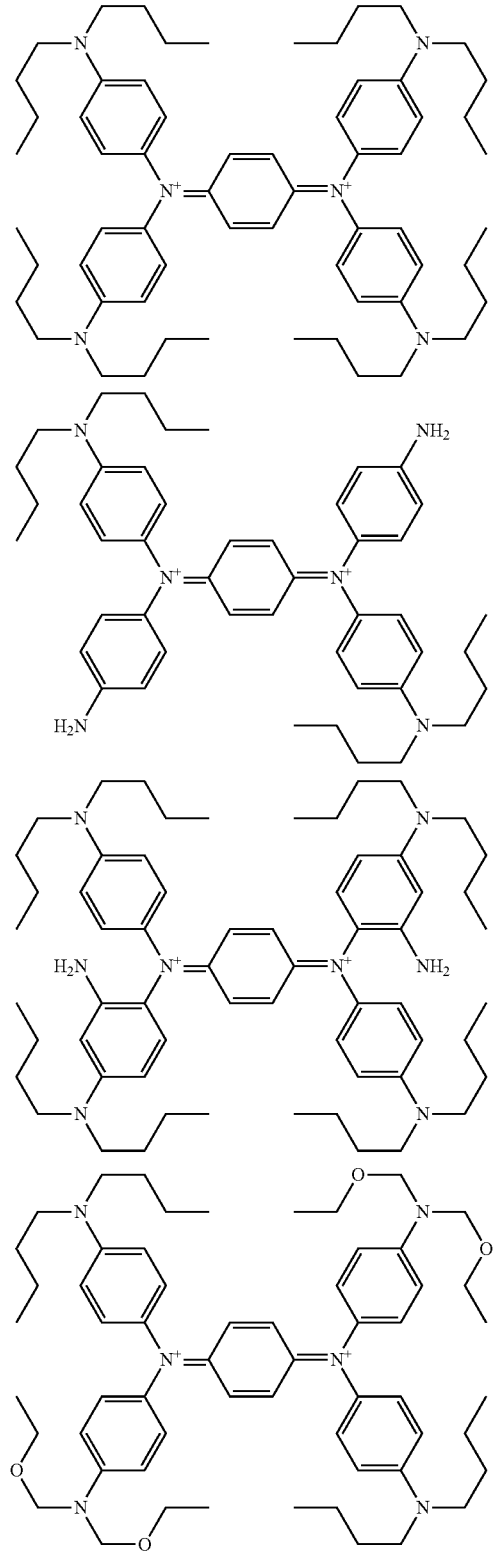
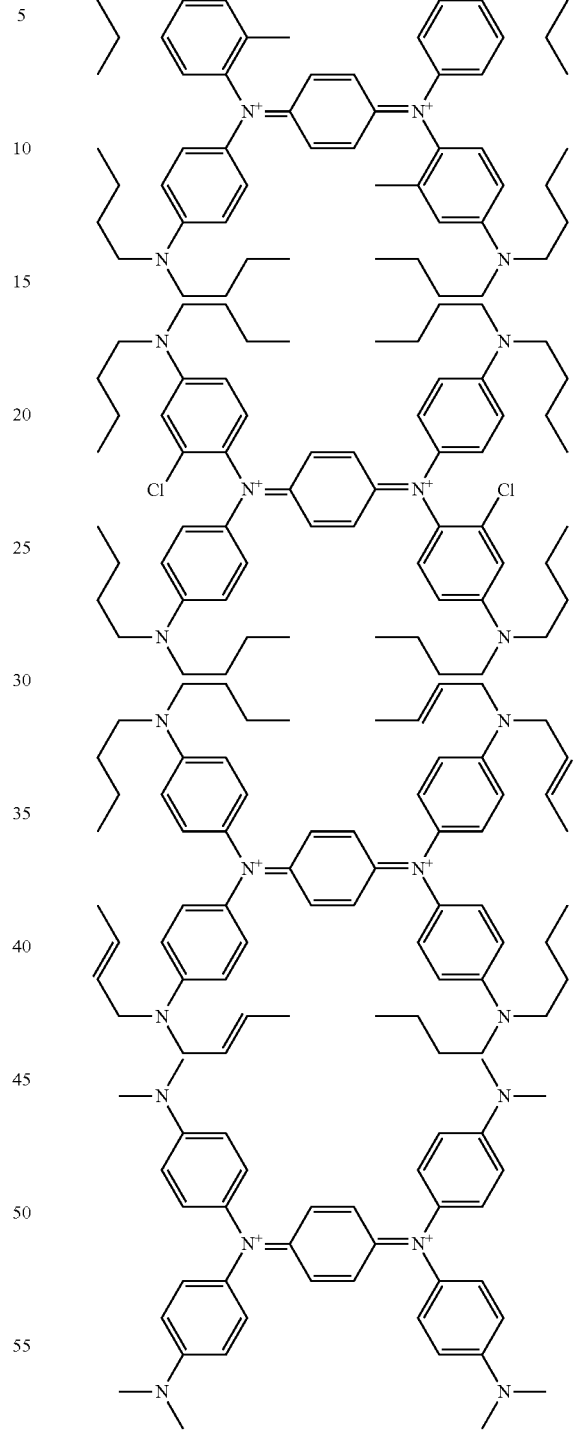

The cyanine compound represented by the above general formula (IV) and the diimmonium compound represented by the above general formula (V) may be used as colorant compounds in the same layer as the present cyanine compound (C). Forming these into the same layer can shorten processes and cut costs.

When using the present cyanine compound (C), the cyanine compound represented by the above general formula (IV), and the diimmonium compound represented by the above general formula (V) in the same layer, it is preferable to use 500 to 5000 parts by mass, in total, of the cyanine compound represented by the above general formula (IV) and the diimmonium compound represented by the above general formula (V) with respect to 100 parts by mass of the cyanine compound (C), because this improves moisture-and-heat resistance and/or lightfastness.

When using the above-mentioned colorant compound(s) to prepare the clay mineral composite (G) having colorant cations intercalated into the layered clay mineral (D), the colorant cations may be combinedly used either by: intercalating the present cyanine cations (A), the cations represented by the above general formula (IV), and the cations represented by the above general formula (V) into the layered clay mineral together at the time of preparing the clay mineral composite; or mixing clay minerals having the respective cations intercalated therein.

The color correction material of the present invention may further contain necessary amounts of organic solvents, tackifiers, softeners, light-resistance imparting agents, UV absorbers, antioxidants, plasticizers, antifoaming agents, leveling agents, dispersing agents, curing agents, and the like.

The color correction material of the present invention may be used for image display devices, such as liquid crystal displays (LCDs), plasma display panels (PDPs), electroluminescence displays (ELDs), cathode-ray tube displays (CRTs), CCD image sensors, CMOS sensors, fluorescent display tubes, and field emission displays, and also for analytical equipment, for manufacturing semiconductor devices, for astronomical observations, for optical communication, eyeglass lenses, windows, and the like. The present color correction material may suitably be used by being blended with a binder resin (E) to form a film-forming composition and further make an optical filter therefrom.

Next, the film-forming composition of the present invention will be described.

The film-forming composition of the present invention is made by blending a binder resin (E) to the present color correction material. Examples of the binder resin (E) include: natural macromolecular materials such as gelatin, casein, starch, cellulose derivatives, and alginic acid; synthetic polymer materials such as polymethyl methacrylate, polyvinyl butyral, polyvinyl pyrrolidone, polyvinyl alcohol, polyvinyl chloride, styrene-butadiene copolymer, polystyrene, polyester, polyether, polycarbonate, polyamide, polyimide, polyurethane, melamine resins, and cyclic olefin resins; and adhesives.

Examples of usable adhesives include known clear adhesives for laminated glass, such as silicone adhesives, urethane adhesives, acrylic adhesives, polyvinyl butyral adhesives, polyvinyl ether adhesives, ethylene-vinyl acetate adhesives, polyolefin adhesives, SBR adhesives, and rubber-based adhesives. Among them, acrylic adhesives, and particularly acidic acrylic adhesives, are preferably used.

The acrylic adhesives are not particularly limited, and usable examples include: homopolymers of monomers having a reactive functional group, such as a carboxyl, hydroxyl, amide, amino, or epoxy group, and an ethylenic unsaturated double bond; copolymers made by combining several types of the above monomers; or copolymers of the above monomers having a reactive functional group and an ethylenic unsaturated double bond and monomers having an ethylenic unsaturated double bond, such as (meth)acrylic monomers and vinyl monomers. It is also possible to use adhesives that contain, as curing agents to enhance cohesion of the adhesives as necessary, cross-linking agents such as metal chelate compounds, isocyanate-type compounds, melamine compounds, epoxy-type compounds, amine-type compounds, aziridine-type compounds, and oxazoline compounds.

Commercially-available acrylic adhesives may be used, and examples include "DB-Bond 5541" (product of Diabond Industry Co., Ltd.), "SK-Dyne" AS-1925, KP-2230, and SK-1811L (product of Soken Chemical & Engineering Co., Ltd.), "DX2-PDP-19" (product of Nippon Shokubai Co., Ltd.), "AT-3001" (product of Saiden Chemical Industry Co., Ltd.), "Oribain BPS5896" (product of Toyo Ink Mfg. Co., Ltd.), and "CS-9611" (product of Nitto Denko Corporation).

In the film-forming composition of the present invention, the content of the color correction material with respect to the film-forming composition of the invention is preferably 0.0001 to 50% by mass, and more preferably 0.001 to 5% by mass. The amount of the binder resin (E) used in the film-forming composition of the invention is preferably 0.1 to 99% by mass, and more preferably 1 to 80% by mass.

The film-forming composition of the present invention may further contain necessary amounts of optional components, such as light absorbers, fillers, and various stabilizers.

The film-forming composition of the present invention is preferably used as a constituent material of an optical filter described below.

Next, the optical filter of the present invention will be described.

The optical filter of the present invention has a layer composed of the above-described film-forming composition. In the optical filter of the invention, and particularly in an optical filter for image-display purposes, the amount of the cyanine compound (C) used per unit area of the optical filter is generally 1 to 1000 $mg/m^2$, and preferably 5 to 100 $mg/m^2$. A usage amount of less than 1 $mg/m^2$ cannot achieve sufficient light-absorbing effects, whereas a usage amount of over 1000 $mg/m^2$ may make the color of the filter too strong and deteriorate display quality, etc., and may also lower the brightness. Note that, when using a mixture of several types of cyanine compounds as the cyanine compound (C) of the present invention, the above "usage amount" of the cyanine compound (C) of the invention refers to the total amount of all the cyanine compounds.

When employed for an image display device, the optical filter of the present invention is generally arranged on the front face of the display. For example, the optical filter may be attached directly to the surface of the display, or in cases where a front panel or an electromagnetic-wave shield is provided on the front-side of the display, the optical filter may be attached to the front surface (outer side) or the back surface (display side) of the front panel or electromagnetic-wave shield.

When used for image display purposes, the optical filter of the present invention may include light absorbers that absorb light at wavelengths outside the 480-500 nm range for color-tone adjustment etc., or may include light absorbers, other than the salt of the colorant cation and the anion of the present invention, that support the 480-500 nm range for preventing reflection and glare of external light. Further, in cases where the image display device is a plasma display, the filter may include near-infrared radiation absorbers, other than the salt of the colorant cation and the anion of the present invention, that support the 750-1100 nm range.

Examples of the light absorbers for color-tone adjustment include light absorbers used for removing orange light in the 550-600 nm range, such as: trimethine cyanine derivatives such as trimethine indolium compounds, trimethine benzooxazolium compounds, and trimethine benzothiazolium compounds; pentamethine cyanine derivatives such as pentamethine oxazolium compounds and pentamethine thiazolium compounds; squarylium dye derivatives; azomethine dye derivatives; xanthene dye derivatives; azo dye derivatives; pyrromethene dye derivatives; azo metal complex derivatives; rhodamine dye derivatives; phthalocyanine derivatives; porphyrin derivatives; and dipyrromethene metal chelate compounds.

Examples of the light absorbers supporting the 480-500 nm range for preventing glare of external light include: monomethine cyanine derivatives; trimethine cyanine derivatives such as trimethine indolium compounds, trimethine oxazolium compounds, trimethine thiazolium compounds, and indolidene trimethine thiazonium compounds; merocyanine derivatives; phthalocyanine derivatives; naphthalocyanine derivatives; porphyrin derivatives; and dipyrromethene metal chelate compounds.

Examples of the near-infrared radiation absorbers supporting the 750-1100 nm range for preventing malfunction of infrared remote controllers include: pentamethine cyanine derivatives such as pentamethine benzoindolium compounds, pentamethine benzooxazolium compounds, and pentamethine benzothiazolium compounds; heptamethine cyanine derivatives such as heptamethine indolium compounds, heptamethine benzoindolium compounds, heptamethine oxazolium compounds, heptamethine benzooxazolium compounds, heptamethine thiazolium compounds, and heptamethine benzothiazolium compounds; diimmonium compounds; aminium compounds; squarylium derivatives; nickel complexes such as bis(stilbenedithiolato) compounds, bis(benzenedithiolato)nickel compounds, and bis(camphordithiolato)nickel compounds; squarylium derivatives; azo dye derivatives; phthalocyanine derivatives; porphyrin derivatives; and dipyrromethene metal chelate compounds.

In the optical filter of the present invention, the above-described light absorber for color-tone adjustment, the light absorber supporting the 480-500 nm range, and the near-infrared radiation absorber may be contained in the same layer as, or in a different layer from, the color correction material of the present invention. In cases of using, for example, the second color correction material containing the clay mineral composite (G) as the color correction material, the amount of usage of each of the above-mentioned light absorbers is generally 10 to 5000 parts by mass with respect to 100 parts by mass of the clay mineral composite (G).

The optical filter of the present invention may, for example, be typically structured by providing, on a transparent support, various layers such as an undercoat layer, an anti-reflection layer, a hard-coat layer, a lubricating layer, and an adhesive layer as necessary. For example, the color correction material of the present invention may be contained in at least one of the undercoat layer, anti-reflection layer, hard-coat layer, lubricating layer, and/or adhesive layer. Instead, a color correction layer made using the film-forming composition of the present invention may be formed in addition to these layers. A preferred structure of the optical filter of the invention would be to include the color correction material of the invention in the adhesive layer, because the production steps can be reduced and a laminated optical filter can be manufactured at low cost.

Examples of materials usable for the transparent support include: inorganic materials such as glass; cellulose esters such as diacetyl cellulose, triacetyl cellulose (TAC), propionyl cellulose, butyryl cellulose, acetylpropionyl cellulose, and nitrocellulose; polyamide; polyimide; polyurethane; epoxy resin; polycarbonate; polyesters such as polyethylene terephthalate, polyethylene naphthalate, polybutylene terephthalate, poly-1,4-cyclohexanedimethylene terephthalate, polyethylene-1,2-diphenoxyethane-4,4'-dicarboxylate, and polybutylene terephthalate; polystyrene; polyolefins such as polyethylene, polypropylene, and polymethylpentene; vinyl compounds such as polyvinyl acetate, polyvinyl chloride, and polyvinyl fluoride; acrylic resins such as polymethyl methacrylate and polyacrylic esters; polycarbonate; polysulfone; polyethersulfone; polyetherketone; polyetherimide; polyoxyethylene; norbornene resin; and other polymers. The transmittance of the transparent support is preferably 80% or above, and more preferably 86% or above. The haze is preferably 2% or less, and more preferably 1% or less. The refractive index is preferably 1.45 to 1.70.

The transparent support may contain other additives, such as IR absorbers, UV absorbers, antioxidants such as phenol-based or phosphorus-based antioxidants, flame retardants, slip additives, antistatic agents, and/or inorganic particulates, and the transparent support may be subjected to various surface treatments.

Examples of the inorganic particulates include silicon dioxide, titanium dioxide, barium sulfate, and calcium carbonate.

Examples of the above-mentioned surface treatments include chemical treatment, mechanical treatment, corona discharge treatment, flame treatment, UV irradiation, high-frequency/microwave treatment, glow discharge treatment, active plasma treatment, laser treatment, treatment with mixed acid, and ozone oxidation.

In cases where the optical filter has a light-absorbing layer containing light absorber(s), an undercoat layer is used between the transparent support and the light-absorbing layer. The undercoat layer is formed as a layer containing a polymer having a glass transition temperature of −60° C. to 60° C., as a layer whose surface on the light-absorbing-layer side is made coarse, or as a layer containing a polymer having an affinity for the polymer in the light-absorbing layer. Instead, the undercoat layer may be provided on the surface of a transparent support that does not have a light-absorbing layer with the aim of enhancing the bonding force between the transparent support and the layer provided thereon (e.g., the anti-reflection layer or the hard-coat layer), or enhancing the affinity between the optical filter and a bonding agent for bonding the optical filter to an image display device. The thickness of the undercoat layer is preferably 2 nm to 20 µm, more preferably 5 nm to 5 µm, even more preferably 20 nm to 2 µm, further more preferably 50 nm to 1 µm, and most preferably 80 nm to 300 nm. The undercoat layer containing a polymer having a glass transition temperature of −60° C. to 60° C. bonds the transparent support and the filter layer together by means of the polymer's adhesiveness. For example, the polymer having a glass transition temperature of −60° C. to 60° C. can be prepared through polymerization or copolymerization of, for example, vinyl chloride, vinylidene chloride, vinyl acetate, butadiene, neoprene, styrene, chloroprene, acrylate, methacrylate, acrylonitrile, or methyl vinyl ether. The glass transition temperature is preferably 50° C. or below, more preferably 40° C. or below, even more preferably 30° C. or below, further more preferably 25° C. or below, and most preferably 20° C. or below. The modulus of elasticity of the undercoat layer at 25° C. is preferably 1 to 1000 MPa, even more preferably 5 to 800 MPa, and most preferably 10 to 500 MPa. The undercoat layer whose surface on the light-absorbing-layer side is made coarse serves to bond the transparent support and the light-absorbing layer together by forming the light-absorbing layer on the coarse surface. The undercoat layer whose surface on the light-absorbing-layer side is made coarse can easily be made by application of a polymer latex. The average particle size of the latex is preferably 0.02 to 3 µm, and more preferably 0.05 to 1 µm.

Examples of the polymer having an affinity for the binder polymer in the light-absorbing layer include acrylic resin, cellulose derivatives, gelatin, casein, starch, polyvinyl alcohol, soluble nylon, and polymer latices. The optical filter of the present invention may also have two or more undercoat layers. The undercoat layer may include other additives, such as solvents for swelling the transparent support, matte agents, surfactants, antistatic agents, coating aids, and hardeners.

The anti-reflection layer must have a low refractive-index layer. The refractive index of the low refractive-index layer is lower than the refractive index of the transparent support. The refractive index of the low refractive-index layer is preferably 1.20 to 1.55, and more preferably 1.30 to 1.50. The thickness of the low refractive-index layer is preferably 50 to 400 nm, and more preferably 50 to 200 nm. The low refractive-index layer can be formed as a layer composed of a low-refractive-index fluorine-containing polymer (disclosed in JP-A-57-34526, JP-A-3-130103, JP-A-6-115023, JP-A-8-313702, and JP-A-7-168004), as a layer prepared by sol-gel methods (disclosed in JP-A-5-208811, JP-A-6-299091, and JP-A-7-168003), or as a layer containing particulates (disclosed in JP-B-60-59250, JP-A-5-13021, JP-A-6-56478, JP-A-7-92306, and JP-A-9-288201). In cases of employing the above-mentioned layer containing particulates, voids can be formed in the low refractive-index layer as microvoids between or within the particulates. The layer containing particulates has a voidage of preferably 3 to 50 vol %, and more preferably 5 to 35 vol %.

In order to prevent reflection of light in a wide range of wavelengths, it is preferable to laminate layers having higher refractive index (medium and high refractive-index layers) in the anti-reflection layer in addition to the low refractive-index layer. The refractive index of the high refractive-index layer is preferably 1.65 to 2.40, and more preferably 1.70 to 2.20. The refractive index of the medium refractive-index layer is adjusted to a value intermediate between the refractive index of the low refractive-index layer and that of the high refractive-index layer. The refractive index of the medium refractive-index layer is preferably 1.50 to 1.90, and more preferably 1.55 to 1.70. The thickness of each of the medium and high refractive-index layers is preferably 5 nm to 100 nm, even more preferably 10 nm to 10 µm, and most preferably 30 nm to 1 µm. The haze of each of the medium and high refractive-index layers is preferably 5% or less, even more preferably 3% or less, and most preferably 1% or less. The medium and high refractive-index layers can be formed using a polymer binder having a relatively high refractive index. Examples of polymers having a high refractive index include polystyrene, styrene copolymers, polycarbonate, melamine resin, acrylic resin, phenolic resin, epoxy resin, and polyurethane obtained by reacting cyclic (alicyclic or aromatic) isocyanate and a polyol. Other polymers having a high refractive index include polymers having a cyclic (aromatic, heterocyclic, or alicyclic) group and polymers having a halogen atom, other than fluorine, as a substituent. It is also possible to use a polymer made by polymerization of a monomer that is introduced with a double bond so that it can undergo radical curing.

Inorganic particulates may be dispersed in the polymer binder to obtain even higher refractive indices. The refractive index of the inorganic particulates is preferably 1.80 to 2.80. The inorganic particulates are preferably made of metal oxides or metal sulfides. Examples of metal oxides/sulfides include titanium oxide (e.g., rutile, a mixed crystal of rutile and anatase, anatase, or an amorphous structure), tin oxide, indium oxide, zinc oxide, zirconium oxide, and zinc sulfide. Among these, titanium oxide, tin oxide, and indium oxide are particularly preferred. The inorganic particulates may employ the above-mentioned metal oxide or metal sulfide as a main component and also contain other elements. Herein, "main component" refers to a component having the largest content (% by mass) among the components constituting the particulates. Examples of other elements include Ti, Zr, Sn, Sb, Cu, Fe, Mn, Pb, Cd, As, Cr, Hg, Zn, Al, Mg, Si, P, and S. Further, the medium and high refractive-index layers may be made using a film-formable inorganic material that is either dispersible in a solvent or is itself in liquid form, such as an alkoxide of various elements, a salt of an organic acid, a coordination compound (e.g., a chelate compound) bonded to a coordinating compound, or an active inorganic polymer.

The surface of the anti-reflection layer may be provided with an anti-glare function (function of preventing the surrounding scenes around the film from being reflected in the film surface by scattering the incident light at the surface). The anti-reflection layer can be provided with the anti-glare function by, for example: forming fine projections and depressions on the surface of a transparent film and forming the anti-reflection layer on that surface; or first forming an anti-reflection layer and then forming projections and depressions on the surface thereof using an emboss roll. The anti-reflection layer having an anti-glare function generally has a haze of 3 to 30%.

The hard-coat layer has hardness higher than that of the transparent support. The hard-coat layer preferably contains a cross-linked polymer. The hard-coat layer may be made using, for example, acrylic, urethane-based, or epoxy-based polymers, oligomers, or monomers (e.g. UV curable resin). Silica-based materials may also be used for forming the hard-coat layer.

The surface of the anti-reflection layer (low refractive-index layer) may have a lubricating layer. The lubricating layer serves to provide slipperiness to the surface of the low refractive-index layer and improve scratch resistance. The lubricating layer may be made using, for example, polyorganosiloxane (e.g. silicone oil), natural wax, petroleum wax, metal salts of higher fatty acids, fluorine-based lubricants, or derivatives thereof. The thickness of the lubricating layer is preferably 2 to 20 nm.

The above-mentioned organic solvent is not particularly limited, and various known solvents may be used as appropriate. Examples include: alcohols such as isopropanol; ether-alcohols such as methyl cellosolve, ethyl cellosolve, butyl cellosolve, and butyl diglycol; ketones such as acetone, methylethyl ketone, methylisobutyl ketone, cyclohexanone, and diacetone alcohol; esters such as ethyl acetate, butyl acetate, and methoxyethyl acetate; acrylates such as ethyl acrylate and butyl acrylate; fluorinated alcohols such as 2,2,3,3-tetrafluoropropanol; hydrocarbons such as hexane, benzene, toluene, and xylene; and chlorinated hydrocarbons such as methylene dichloride, dichloroethane, and chloroform. The organic solvent(s) may be used singly or mixed.

Next, a method for manufacturing the optical filter of the present invention having the above-described structure will be described, taking, as an example, an optical filter having an adhesive layer which is a preferred embodiment of the invention. Note that in the description below, the second color correction material containing a clay mineral composite (G) is used as the color correction material.

First, the above-described clay mineral composite (G) is prepared according to the process described further above. Meanwhile, an adhesive, serving as a binder resin (E), is prepared separately. Then, to 100 parts by mass, in solids content, of the adhesive serving as the binder resin (E) are blended 0.0001 to 50 parts by mass—preferably 0.001 to 5.0 parts by mass—of the clay mineral composite (G) and 0.1 to 1000 parts by mass—preferably 1.0 to 500 parts by mass—of a solvent such as methylethyl ketone, to prepare an adhesive solution which serves as a film-forming composition of the present invention. The adhesive solution is then applied onto a transparent support, such as a PET film that has been pretreated for easy adhesion, and then dried, to obtain an optical filter of the present invention having an adhesive layer with a thickness of 2 to 400 μm, preferably 5 to 40 μm. In cases where the optical filter of the present invention is to contain the first color correction material or optional component(s), the proportions of the respective components need only be pursuant to the proportions thereof described above.

In the optical filter of the present invention, the color correction material, the binder resin (E), and the optional component(s), such as light absorbers and various stabilizers, may be contained in an adhesive layer provided between any two adjacent layers selected from the transparent support and the various optional layers described above. In that case, the components, such as the color correction material, etc., may first be blended to an adhesive, and then the adhesive may be used to bond the two adjacent layers selected from the transparent support and the various optional layers. Further, the surface of the adhesive layer may be provided with a known separator film, such as a polyethylene terephthalate film pretreated for easy adhesion.

The above-described undercoat layer, anti-reflection layer, hard-coat layer, lubricating layer, light-absorbing layer, adhesive layer, and others, may be formed through general application methods. Examples of application methods include dip coating, air knife coating, curtain coating, roller coating, wire-bar coating, gravure coating, and extrusion coating using a hopper (see U.S. Pat. No. 2,681,294 A). Two or more layers may be formed through simultaneous application. Simultaneous application methods are disclosed in U.S. Pat. No. 2,761,791 A, U.S. Pat. No. 2,941,898 A, U.S. Pat. No. 3,508,947 A, and U.S. Pat. No. 3,526,528 A, all of which are incorporated herein by reference. Mention is also made in Yuji Harazaki, "Coating Engineering" (Asakura Publishing Co., Ltd., 1973), p. 253.

EXAMPLES

The present invention will be described in further detail below according to Evaluation Examples, Comparative Evaluation Examples, and Examples thereof. The present invention, however, is not to be limited by the Examples etc. below. Note that Examples 1-1 to 1-4 are synthesis examples of clay mineral composites (G) according to the present invention, Evaluation Examples 1 to 6 are durability evaluations of color correction materials of the present invention contained in an adhesive layer, and Examples 2-1 to 2-7 are examples for preparing optical filters containing the color correction materials of the present invention.

Example 1-1

Synthesis of Clay Mineral Composite 1

40 g of a dispersion liquid prepared by dispersing 1.0 g of "Lucentite SAN210-A" (layered clay mineral (D); oleophilic smectite; product of Co-op Chemical Co., Ltd.) in 39 g of methylethyl ketone was mixed with 15 g of a solution prepared by dissolving 0.15 g of a hexafluorophosphate of Compound No. 1 (cyanine cation (A)) in 14.85 g of methylethyl ketone, and the mixture was stirred for 1 hour, to ion-exchange a portion of the organic cations (F), i.e., the interlayer ions of "Lucentite SAN210-A", with Compound No. 1 (cyanine cation (A)). To this solution was added 150 ml of methanol, and the precipitated solid was filtered and separated, washed with water, and cleaned with methanol, to obtain 0.72 g of Clay Mineral Composite 1.

[Chem. 17]

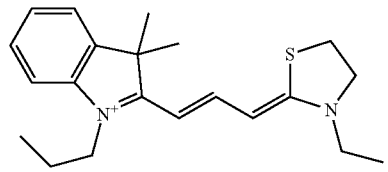

Compound No. 1

Example 1-2

Synthesis of Clay Mineral Composite 2

The same process as in Example 1-1 was employed except that 0.3 g of a hexafluorophosphate of Compound No. 1 (cyanine cation (A)) was used, to obtain 0.70 g of Clay Mineral Composite 2.

Example 1-3

Synthesis of Clay Mineral Composite 3

The same process as in Example 1-1 was employed except that 0.03 g of a hexafluorophosphate of Compound No. 2 (cyanine cation (A)) was used, to obtain 0.14 g of Clay Mineral Composite 3.

[Chem. 17-1]

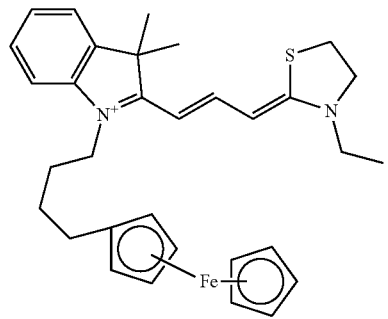

Compound No. 2

Example 1-4

Synthesis of Clay Mineral Composite 4

The same process as in Example 1-1 was employed except that 0.03 g of a hexafluorophosphate of Compound No. 3 (cyanine cation (A)) was used, to obtain 0.12 g of Clay Mineral Composite 4.

[Chem. 17-2]

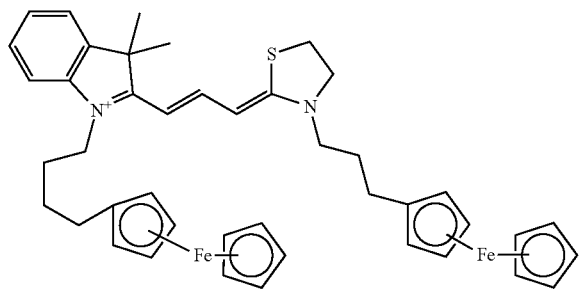

Compound No. 3

Confirmation of Intercalation State:

The X-ray diffraction of each sample was measured with a "RINT 2000-Ultima+" diffractometer from Rigaku Corporation, to calculate the basal spacing. The results are shown in Table 1.

TABLE 1

| Sample | Interplanar Spacing |
| --- | --- |
| SAN210-A | 16.6 Å |
| Clay Mineral Composite 1 | 15.3 Å |
| Clay Mineral Composite 2 | 15.7 Å |
| Clay Mineral Composite 3 | 17.0 Å |
| Clay Mineral Composite 4 | 17.2 Å |

It is considered that intercalation of colorants either narrows the interplanar spacing due to electrostatic attraction or widens the interplanar spacing in proportion to the size of the intercalated molecule. The results of Table 1 show changes in the interplanar spacing, and thus it was determined that the respective colorants were intercalated.

Evaluation Examples 1 to 6 and Comparative Evaluation Examples 1 to 3

Durability Evaluation

Adhesive solutions containing respective color correction materials were prepared according to the respective formulations listed below. Using a bar coater #90, each adhesive solution was coated on a 188-μm-thick polyethylene terephthalate (PET) film pre-treated for easy adhesion, and dried for 5 minutes at 100° C., to form an adhesive layer. A 0.9-mm-thick glass plate was bonded on the adhesive layer, to prepare each test specimen.

Lightfastness Evaluation:

The lightfastness evaluation for each test specimen prepared as above was conducted as follows. The transmittance of the UV absorption spectrum at $\lambda_{max}$ was measured; the test specimen was then left for 50 hours in a fade meter ("Table Sun TS-2"; product of Suga Test Instruments Co., Ltd.); and the transmittance of the UV absorption spectrum at $\lambda_{max}$ was measured again, to find the rate of the transmittance after exposure to light to the transmittance before exposure, assuming the latter to be "100". The results are shown in Table 2.

Heat Resistance Evaluation:

The heat resistance evaluation for each test specimen prepared as above was conducted as follows. The transmittance of the UV absorption spectrum at $\lambda_{max}$ was measured; the test specimen was then left for 500 hours in a constant temperature bath at 80° C.; and the transmittance of the UV absorption spectrum at $\lambda_{max}$ was measured again, to find the rate of the transmittance after heat exposure to the transmittance before heat exposure, assuming the latter to be "100". The results are shown in Table 2.

Moisture-and-Heat Resistance Evaluation:

The moisture-and-heat resistance evaluation for each test specimen prepared as above was conducted as follows. The transmittance of the UV absorption spectrum at $\lambda_{max}$ was measured; the test specimen was then left for 500 hours in a constant-temperature, constant-humidity bath adjusted to provide a constant-temperature, constant-humidity environment of 60° C. and 90% RH; and the transmittance of the UV absorption spectrum at $\lambda_{max}$ was measured again, to find the rate of the transmittance after exposure to moisture and heat to the transmittance before exposure, assuming the latter to be "100". The results are shown in Table 2.

Formulation of Evaluation Example 1:
Hexafluorophosphate of Compound No. 1: 2.00 mg
Smectite: 20.0 mg
Acrylic adhesive ("DB-Bond 5541"; product of Diabond Industry Co., Ltd.): 4.68 g
Methylethyl ketone: 1.99 g
Formulation of Evaluation Example 2:
Clay Mineral Composite 1: 8.00 mg
Acrylic adhesive ("DB-Bond 5541"; product of Diabond Industry Co., Ltd.): 4.68 g
Methylethyl ketone: 1.99 g
Formulation of Evaluation Example 3:
Hexafluorophosphate of Compound No. 2: 2.00 mg
Smectite: 20.0 mg
Acrylic adhesive ("DB-Bond 5541"; product of Diabond Industry Co., Ltd.): 4.68 g
Methylethyl ketone: 1.99 g
Formulation of Evaluation Example 4:
Clay Mineral Composite 3: 8.00 mg
Acrylic adhesive ("DB-Bond 5541"; product of Diabond Industry Co., Ltd.): 4.68 g
Methylethyl ketone: 1.99 g
Formulation of Evaluation Example 5:
Hexafluorophosphate of Compound No. 3: 2.00 mg
Smectite: 20.0 mg
Acrylic adhesive ("DB-Bond 5541"; product of Diabond Industry Co., Ltd.): 4.68 g
Methylethyl ketone: 1.99 g
Formulation of Evaluation Example 6:
Clay Mineral Composite 4: 8.00 mg
Acrylic adhesive ("DB-Bond 5541"; product of Diabond Industry Co., Ltd.): 4.68 g
Methylethyl ketone: 1.99 g
Formulation of Comparative Evaluation Example 1:
Hexafluorophosphate of Compound No. 1: 2.00 mg
Acrylic adhesive ("DB-Bond 5541"; product of Diabond Industry Co., Ltd.): 4.68 g
Methylethyl ketone: 1.99 g
Formulation of Comparative Evaluation Example 2:
Hexafluorophosphate of Compound No. 2: 2.00 mg
Acrylic adhesive ("DB-Bond 5541"; product of Diabond Industry Co., Ltd.): 4.68 g
Methylethyl ketone: 1.99 g
Formulation of Comparative Evaluation Example 3:
Hexafluorophosphate of Compound No. 3: 2.00 mg
Acrylic adhesive ("DB-Bond 5541"; product of Diabond Industry Co., Ltd.): 4.68 g
Methylethyl ketone: 1.99 g

TABLE 2

|  | Light-fastness/% | Heat Resistance/% | Moisture-and-Heat Resistance/% |
|---|---|---|---|
| Evaluation Example 1 | 79.5 | 100 | 86.4 |
| Evaluation Example 2 | 84.0 | 93.4 | 84.9 |
| Evaluation Example 3 | 89.8 | 83.1 | 95.3 |
| Evaluation Example 4 | 92.9 | 85.9 | 82.9 |
| Evaluation Example 5 | 96.7 | 93.0 | 99.7 |
| Evaluation Example 6 | 97.7 | 92.4 | 81.8 |
| Comparative Evaluation Example 1 | 74.2 | 83.0 | 72.2 |
| Comparative Evaluation Example 2 | 73.4 | 52.0 | 70.3 |
| Comparative Evaluation Example 3 | 89.2 | 31.3 | 70.0 |

Example 2-1

Optical Filter Preparation No. 1

An adhesive solution, serving as a film-forming composition of the present invention containing a first color correction material, was prepared according to the following formulation. Using a bar coater #90, the adhesive solution was coated on a 188-nm-thick PET film pre-treated for easy adhesion, and then dried for 10 minutes at 100° C., to obtain an optical filter of the present invention having an approximately 10-nm-thick adhesive layer on the PET film. The optical filter obtained was analyzed using a UV-VIS-NIR spectrophotometer "V-570" (product of JASCO Corporation). The $\lambda_{max}$ was at 494 nm, and the half width was 53 nm.

Formulation:
Hexafluorophosphate of Compound No. 1: 2.00 mg
Smectite (oleophilic smectite; "Lucentite STN"; product of Co-op Chemical Co., Ltd.): 10.0 mg
Acrylic adhesive ("DB-Bond 5541"; product of Diabond Industry Co., Ltd.): 20.0 g
Methylethyl ketone: 80.0 g

Example 2-2

Optical Filter Preparation No. 2

An adhesive solution, serving as a film-forming composition of the present invention containing a second color correction material, was prepared according to the following formulation. Using a bar coater #90, the adhesive solution was coated on a 188-μm-thick PET film pre-treated for easy adhesion, and then dried for 10 minutes at 100° C., to obtain an optical filter of the present invention having an approximately 10-μm-thick adhesive layer on the PET film. The optical filter obtained was analyzed using a UV-VIS-NIR spectrophotometer "V-570" (product of JASCO Corporation). The $\lambda_{max}$ was at 494 nm, and the half width was 53 nm.

Formulation:
Clay Mineral Composite 1: 0.120 g
Acrylic adhesive ("DB-Bond 5541"; product of Diabond Industry Co., Ltd.): 70.0 g
Methylethyl ketone: 30.0 g

Example 2-3

Optical Filter Preparation No. 3

An optical filter of the present invention having an approximately 10-μm-thick adhesive layer on a PET film was obtained in the same way as in Example 2-1, except that "DX2-PDP-19" (product of Nippon Shokubai Co., Ltd.) was used in place of "DB-Bond 5541" as the acrylic adhesive and "Coronate L-55E" (product of Nippon Polyurethane Industry Co., Ltd.) was used as a curing agent. The optical filter obtained was analyzed using a UV-VIS-NIR spectrophotometer "V-570" (product of JASCO Corporation). The $\lambda_{max}$ was at 494 nm, and the half width was 53 nm.

Example 2-4

Optical Filter Preparation No. 4

An optical filter was prepared in the same way as in Example 2-1, except that a hexafluorophosphate of Compound No. 2 was used in place of the hexafluorophosphate of Compound No. 1. The optical filter obtained was analyzed using a UV-VIS-NIR spectrophotometer "V-570" (product of JASCO Corporation). The $\lambda_{max}$ was at 496 nm, and the half width was 52.6 nm.

Example 2-5

Optical Filter Preparation No. 5

An optical filter was prepared in the same way as in Example 2-2, except that Clay Mineral Composite 2 was used in place of Clay Mineral Composite 1. The optical filter obtained was analyzed using a UV-VIS-NIR spectrophotometer "V-570" (product of JASCO Corporation). The $\lambda_{max}$ was at 499 nm, and the half width was 57.2 nm.

Example 2-6

Optical Filter Preparation No. 6

An optical filter was prepared in the same way as in Example 2-1, except that a hexafluorophosphate of Compound No. 3 was used in place of the hexafluorophosphate of Compound No. 1. The optical filter obtained was analyzed using a UV-VIS-NIR spectrophotometer "V-570" (product of JASCO Corporation). The $\lambda_{max}$ was at 498 nm, and the half width was 50.6 nm.

Example 2-7

Optical Filter Preparation No. 7

An optical filter was prepared in the same way as in Example 2-2, except that Clay Mineral Composite 3 was used in place of Clay Mineral Composite 1. The optical filter obtained was analyzed using a UV-VIS-NIR spectrophotometer "V-570" (product of JASCO Corporation). The $\lambda_{max}$ was at 499 nm, and the half width was 54.8 nm.

The above-described Evaluation Examples, Comparative Evaluation Examples, and Examples reveal the following facts:

As for systems wherein color correction materials are contained in an adhesive layer, Evaluation Examples 1 to 6 which contain the respective color correction materials of the present invention are superior in lightfastness after 50 hours of exposure to light and also in heat resistance and moisture-and-heat resistance after 500 hours of exposure to heat and/or moisture, compared to Comparative Evaluation Examples 1 to 3 that respectively contain comparative color correction materials, each consisting of a salt of a colorant cation and an anion, instead of the color correction materials of the present invention.

Accordingly, the optical filter of the present invention made using the color correction material of the invention is suitable as an optical filter having excellent lightfastness, heat resistance, and moisture-and-heat resistance.

The invention claimed is:

1. A color correction material comprising: at least one cyanine compound composed of a cyanine cation represented by general formula (I) below and a q-valent anion represented by pAn$^{q-}$ wherein q is an integer of 1 or 2, and p represents a coefficient for keeping the electric charge neutral; and at least one layered clay mineral, wherein the layered clay mineral is an oleophilic smectite:

Formula (I):

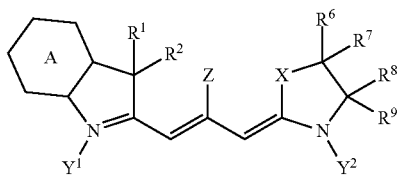

wherein: ring A represents a benzene ring or a naphthalene ring; the hydrogen atom in the ring A may be substituted by an alkyl group having 1 to 10 carbon atoms, an aryl group having 6 to 20 carbon atoms, an arylalkyl group having 7 to 20 carbon atoms, a nitro group, a cyano group, or a halogen atom;

X represents a sulfur atom;

$R^1$, $R^2$ each independently represent a group represented by general formula (II) or (II') below, an alkyl group having 1 to 20 carbon atoms, an aryl group having 6 to 30 carbon atoms, or an arylalkyl group having 7 to 30 carbon atoms; $R^1$ and $R^2$, may be connected to form a 3- to 6-membered alicyclic group;

$R^6$, $R^7$, $R^8$, and $R^9$ each independently represent a hydrogen atom, a group represented by general formula (II) or (II') below, an alkyl group having 1 to 20 carbon atoms, an aryl group having 6 to 30 carbon atoms, an arylalkyl group having 7 to 30 carbon atoms, a halogen atom, or a cyano group;

$Y^1$ and $Y^2$ each independently represent an alkyl group having 1 to 20 carbon atoms, an aryl group having 6 to 30 carbon atoms, an arylalkyl group having 7 to 30 carbon atoms, or a group represented by general formula (III) below, at least one of $Y^1$, and $Y^2$ is a group represented by general formula (III) below;

the methylene group in the alkyl group, the aryl group, and the arylalkyl group, which are the groups that may substitute the hydrogen atom in the ring A or the groups that may be represented by $R^1$, $R^2$, $R^6$, $R^7$, $R^8$, $R^9$, $Y^1$, and $Y^2$, may be interrupted 1 to 3 times by an oxygen atom, a sulfur atom, or a double bond; the hydrogen atom in the alkyl group, the aryl group, and the arylalkyl group may be substituted by a nitro group, a cyano group, or a halogen atom; and Z represents a hydrogen atom;

Formula (II):

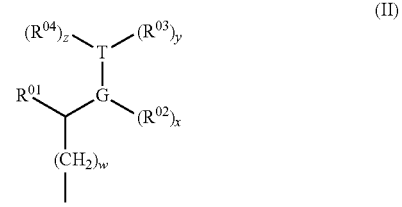

in the above general formula (II): the bond between G and T is a double bond, a conjugated double bond, or a triple bond; G represents a carbon atom; T represents a carbon atom, an oxygen atom, or a nitrogen atom if T is an oxygen atom, then y and z are 0; if T is a nitrogen atom, then y+z is 0 or 1;

w represents a number from 0 to 4; x, y, and z each represent 0 or 1;

$R^{01}$, $R^{02}$, $R^{03}$, and $R^{04}$ each independently represent a hydrogen atom, a hydroxyl group, a nitro group, a cyano group, a halogen atom, or an optionally substituted alkyl group having 1 to 4 carbon atoms; the methylene group in the alkyl group may be interrupted by —O— or —CO—; and $R^{01}$ and $R^{04}$ may be bonded to form a cycloalkene ring or a heterocycle;

Formula (II'):

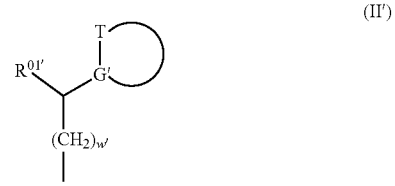

in the above general formula (II') : the bond between G' and T' is a double bond or a conjugated double bond; G' represents a carbon atom; T' represents a carbon atom or a nitrogen atom;

w' represents a number from 0 to 4; $R^{01'}$ represents a hydrogen atom, a hydroxyl group, a nitro group, a cyano group, a halogen atom, or an alkyl group having 1 to 4 carbon atoms optionally substituted with a halogen atom; the methylene group in the alkyl group may be interrupted by —O— or —CO—;

the ring containing G' and T' represents a 5-membered ring that may contain a hetero atom, a 6-membered ring that may contain a hetero atom, a naphthalene ring, a quinoline ring, an isoquinoline ring, an anthracene ring, or an anthraquinone ring; and the ring containing G' and T' may be substituted by a halogen atom, a hydroxyl group, a nitro group, a cyano group, an alkyl group having 1 to 4 carbon atoms, or an alkoxy group having 1 to 4 carbon atoms;

Formula (III):

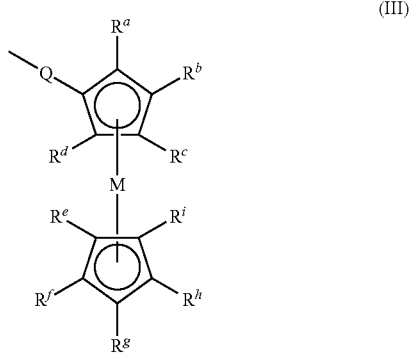

wherein: $R^a$, $R^b$, $R^c$, $R^d$, $R^e$, $R^f$, $R^g$, $R^h$, and $R^i$ each independently represent a hydrogen atom or an alkyl group having 1 to 4 carbon atoms; the methylene group in the alkyl group may be interrupted by —O— or —CO—;
Q represents a direct bond or an optionally substituted alkylene group having 1 to 8 carbon atoms; the methylene group in the alkylene group may be replaced by —O—, —S—, —CO—, —COO—, —OCO—, —SO$_2$—, —NH—, —CONH—, —NHCO—, —N═CH—, or —CH═CH—; and
M represents Fe, Co, Ni, Ti, Cu, Zn, Zr, Cr, Mo, Os, Mn, Ru, Sn, Pd, Rh, Pt, or Ir.

2. A film-forming composition obtained by blending a binder resin to the color correction material according to claim 1.

3. The film-forming composition according to claim 2, characterized by using an adhesive as the binder resin.

4. The film-forming composition according to claim 3, wherein the adhesive is an acrylic adhesive.

5. An optical filter including a layer composed of the film-forming composition according to claim 2.

6. The optical filter according to claim 5, wherein the optical filter is for an image display device.

7. previously presented) The optical filter according to claim 6, wherein the image display device is a plasma display.

8. A color correction material comprising a clay mineral composite obtained by intercalating a cyanine cation represented by general formula (I) below into a layered clay mineral, wherein the layered clay mineral is a smectite:

Formula (I):

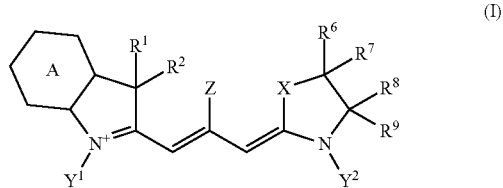

wherein: ring A represents a benzene ring or a naphthalene ring; the hydrogen atom in the ring A may be substituted by an alkyl group having 1 to 10 carbon atoms, an aryl group having 6 to 20 carbon atoms, an arylalkyl group having 7 to 20 carbon atoms, a nitro group, a cyano group, or a halogen atom;
X represents a sulfur atom;
$R^1$, $R^2$ each independently represent a group represented by general formula (II) or (II') below, an alkyl group having 1 to 20 carbon atoms, an aryl group having 6 to 30 carbon atoms, or an arylalkyl group having 7 to 30 carbon atoms; $R^1$ and $R^2$, may be connected to form a 3- to 6-membered alicyclic group;
$R^6$, $R^7$, $R^8$, and $R^9$ each independently represent a hydrogen atom, a group represented by general formula (II) or (II') below, an alkyl group having 1 to 20 carbon atoms, an aryl group having 6 to 30 carbon atoms, an arylalkyl group having 7 to 30 carbon atoms, a halogen atom, or a cyano group;
$Y^1$ and $Y^2$ each independently represent an alkyl group having 1 to 20 carbon atoms, an aryl group having 6 to 30 carbon atoms, an arylalkyl group having 7 to 30 carbon atoms, or a group represented by general formula (III) below, at least one of $Y^1$, and $Y^2$ is a group represented by general formula (III) below;
the methylene group in the alkyl group, the aryl group, and the arylalkyl group, which are the groups that may substitute the hydrogen atom in the ring A or the groups that may be represented by $R^1$, $R^2$, $R^6$, $R^7$, $R^8$, $R^9$, $Y^1$, and $Y^2$, may be interrupted 1 to 3 times by an oxygen atom, a sulfur atom, or a double bond; the hydrogen atom in the alkyl group, the aryl group, and the arylalkyl group may be substituted by a nitro group, a cyano group, or a halogen atom; and
Z represents a hydrogen atom;

Formula (II):

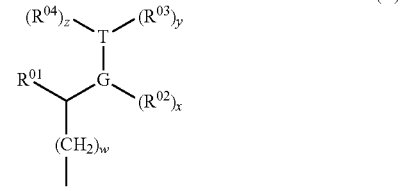

in the above general formula (II): the bond between G and T is a double bond, a conjugated double bond, or a triple bond; G represents a carbon atom; T represents a carbon atom, an oxygen atom, or a nitrogen atom if T is an oxygen atom, then y and z are 0; if T is a nitrogen atom, then y+z is 0 or 1;
w represents a number from 0 to 4; x, y, and z each represent 0 or 1;
$R^{01}$, $R^{02}$, $R^{03}$, and $R^{04}$ each independently represent a hydrogen atom, a hydroxyl group, a nitro group, a cyano group, a halogen atom, or an optionally substituted alkyl group having 1 to 4 carbon atoms; the methylene group in the alkyl group may be interrupted by —O— or —CO—; and $R^{01}$ and $R^{04}$ may be bonded to form a cycloalkene ring or a heterocycle;

Formula (II'):

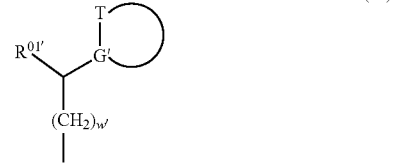

in the above general formula (II') : the bond between G' and T' is a double bond or a conjugated double bond; G' represents a carbon atom; T' represents a carbon atom or a nitrogen atom;
w' represents a number from 0 to 4; $R^{01'}$ represents a hydrogen atom, a hydroxyl group, a nitro group, a cyano group, a halogen atom, or an alkyl group having 1 to 4 carbon atoms optionally substituted with a halogen atom; the methylene group in the alkyl group may be interrupted by —O— or —CO—;

the ring containing G' and T' represents a 5-membered ring that may contain a hetero atom, a 6-membered ring that may contain a hetero atom, a naphthalene ring, a quinoline ring, an isoquinoline ring, an anthracene ring, or an anthraquinone ring; and the ring containing G' and T' may be substituted by a halogen atom, a hydroxyl group, a nitro group, a cyano group, an alkyl group having 1 to 4 carbon atoms, or an alkoxy group having 1 to 4 carbon atoms;

Formula (III):

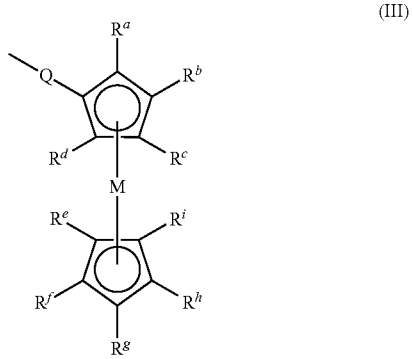

(III)

wherein: $R^a$, $R^b$, $R^c$, $R^d$, $R^e$, $R^f$, $R^g$, $R^h$, and $R^i$ each independently represent a hydrogen atom or an alkyl group having 1 to 4 carbon atoms; the methylene group in the alkyl group may be interrupted by —O— or —CO—;

Q represents a direct bond or an optionally substituted alkylene group having 1 to 8 carbon atoms; the methylene group in the alkylene group may be replaced by —O—, —S—, —CO—, —COO—, —OCO—, —SO$_2$—, —NH—, —CONH—, —NHCO—, —N═CH—, or —CH═CH—; and M represents Fe, Co, Ni, Ti, Cu, Zn, Zr, Cr, Mo, Os, Mn, Ru, Sn, Pd, Rh, Pt, or Ir.

9. The color correction material according to claim 8, wherein the clay mineral composite has a structure in which an organic cation is also intercalated in, wherein the smectite is an oleophilic smectite.

10. A film-forming composition obtained by blending a binder resin to the color correction material according to claim 9.

11. A film-forming composition obtained by blending a binder resin to the color correction material according to claim 8.

* * * * *